(12) United States Patent
Daigle et al.

(10) Patent No.: US 10,912,294 B2
(45) Date of Patent: Feb. 9, 2021

(54) COMPOSITION FOR USE AS PESTICIDE, FERTILIZER, OR BOTH, AND USES THEREOF

(71) Applicant: Laboratoire M2, Sherbrooke (CA)

(72) Inventors: Francois Daigle, Canton de Hatley (CA); Ann Letellier, Massueville (CA); Sylvain Quessy, Ste-Anne-de-Sorel (CA); Serge Auray, Sherbrooke (CA)

(73) Assignee: LABORATOIRE M2, Sherbrooke (CA)

( * ) Notice: Subject to any disclaimer, the term of this patent is extended or adjusted under 35 U.S.C. 154(b) by 0 days.

(21) Appl. No.: 15/547,151

(22) PCT Filed: Feb. 16, 2016

(86) PCT No.: PCT/CA2016/050138
§ 371 (c)(1),
(2) Date: Jul. 28, 2017

(87) PCT Pub. No.: WO2016/131134
PCT Pub. Date: Aug. 25, 2016

(65) Prior Publication Data
US 2018/0014534 A1 Jan. 18, 2018

Related U.S. Application Data

(60) Provisional application No. 62/116,630, filed on Feb. 16, 2015.

(51) Int. Cl.
| *A01N 31/08* | (2006.01) |
| *C05G 3/60* | (2020.01) |
| *A01N 25/00* | (2006.01) |
| *A01N 25/02* | (2006.01) |
| *A01N 25/30* | (2006.01) |

(52) U.S. Cl.
CPC ............ *A01N 31/08* (2013.01); *A01N 25/00* (2013.01); *A01N 25/02* (2013.01); *A01N 25/30* (2013.01); *C05G 3/60* (2020.02)

(58) Field of Classification Search
CPC ........ A01N 31/08; A01N 25/30; A01N 25/02; A01N 25/00; C05G 3/02; C05G 3/60
See application file for complete search history.

(56) References Cited

U.S. PATENT DOCUMENTS

| 5,403,587 A | 4/1995 | McCue et al. |
| 7,018,641 B1 * | 3/2006 | Momol ................. A01N 65/00 424/405 |

FOREIGN PATENT DOCUMENTS

| CA | 2012288 A1 * | 9/1990 | ............. A23B 7/154 |
| CA | 2326655 A1 | 10/1999 | |
| CA | 2371925 A1 | 12/2000 | |
| CA | 2441730 A1 | 10/2002 | |
| CA | 2720738 C | 10/2014 | |
| CN | 102388923 A * | 3/2012 | |
| CN | 101507432 B * | 12/2012 | |
| CN | 103999851 A | 8/2014 | |
| WO | 0184936 A1 | 11/2001 | |
| WO | 03037270 A2 | 5/2003 | |
| WO | 2007133934 A1 | 11/2007 | |
| WO | 2014151449 A1 | 9/2014 | |

OTHER PUBLICATIONS

CN102388923, Translation rom Patent Translate powered by EPO and Google, 2012, pp. 1-8 (Year: 2012).*
Vu, R.., CZ 201300653 Derwent Abstract, 2013, 2 pages.*
Zhang et al., CN 101507432B, Translation, 2012, Patent Translate powered by EPO and Google, 7 pages. (Year: 2012).*
International Search Report of PCT/CA2016/050138; Gatineau; dated May 6, 2016; Barabe, Charles.

* cited by examiner

*Primary Examiner* — John Pak
*Assistant Examiner* — Andriae M Holt
(74) *Attorney, Agent, or Firm* — Benoit & Cote, Inc.; Mathieu Miron

(57) ABSTRACT

The invention relates to compositions in which the phenolic compound thymol or carvacrol is solubilized or dispersed in water through the addition of a surfactant and a solvent. In certain embodiments is also comprised a further pesticide, a fertilizer, a defoamer, a plant growth regulator, or combinations thereof. Also taught are methods for the control of pests or for regulating the growth of plants through contacting the plants, their seeds, or soil in which they grow with said compositions.

6 Claims, 9 Drawing Sheets

COMPOSITION FOR USE AS PESTICIDE, FERTILIZER, OR BOTH, AND USES THEREOF

CROSS-REFERENCE TO RELATED APPLICATIONS

This application is a US National Phase application under 35 USC § 371 of PCT/CA2016/050138, filed Feb. 16, 2016, which claims priority from and the benefit of U.S. Provisional Application No. 62/116,630, filed on Feb. 16, 2015, the specifications of which are hereby incorporated by reference in their entireties.

BACKGROUND

(a) Field

The subject matter disclosed generally relates to pest control and/or fertilizer compositions, and uses thereof.

(b) Related Prior Art

Soil is a reservoir for a variety of plant and animal diseases. These include diseases caused by microorganisms (fungi, bacteria, actinomyces, phytoplasmas, protozoa and viruses), and larger soil organisms such as nematodes as well as insects (e.g. ants, aphids) and small animals (e.g. slugs, snails, rodents). Plant and animal pathogens may also be spread via insect vectors or by soil animals such as nematodes. The most common disease caused by soil-borne pathogen are rots that affect below the ground plant parts, and vascular wilts as a result of root infections. Some soil-borne pathogens also cause diseases on the aboveground parts of the plants (like on the foliage).

The most important pathogen group causing soil-borne disease are the multicellular organism fungi. In general, a fungal infection can cause local or extensive necrosis. It can also inhibit normal growth (hypotrophy) or induce excessive abnormal growth (hypertrophy or hyperplasia) in a portion of or throughout an entire plant. Symptoms associated with necrosis include leaf spots, blight, scab, rots, damping-off, anthracnose, dieback, and canker. Symptoms associated with hyperplasia include clubroot, galls, warts, and leaf curls. The principal control measures include the use of disease-free seed and propagating stock, the destruction of all plant materials that may harbor pathogenic fungi, crop rotation, the development and use of resistant plant varieties, and the use of chemical and biological fungicides.

Many species of bacteria can cause disease in plants, animals and humans. The principal genera of plant pathogenic bacteria are *Agrobacterium, Clavibacter, Erwinia, Pseudomonas, Xanthomonas, Streptomyces*, and *Xylella*. Bacterial diseases can be grouped into four broad categories based on the extent of damage to plant tissue and the symptoms that they cause, which may include vascular wilt, necrosis, soft rot, and tumors. In order for a bacterium to produce a disease in a plant, the bacterium must first invade the plant tissue and multiply. Bacterial pathogens enter plants through wounds, principally produced by adverse weather conditions, humans, tools and machinery, insects, and nematodes, or through natural openings such as stomates, lenticels, hydathodes, nectar-producing glands, and leaf scars. Losses from bacterial diseases are reduced by the use of pathogen-free seed. Bactericidal seed compounds control some bacterial diseases, such as angular leaf spot of cotton, gladiolus scab, and soft rot of ornamentals. Protective bactericidal sprays are used against bacterial blights of beans and celery, fire blight, crown gall, blackleg of delphinium, and filbert and walnut blights.

Viruses and viroids are the smallest of the infectious agents. Both viruses and viroids are obligate parasites, as they are able to multiply or replicate only within a living cell of a particular host. A single plant species may be susceptible to infection by several different viruses or viroids. Most disease-causing viruses are carried and transmitted naturally by insects and mites, which are called vectors of the virus. The symptoms of viral and viroid plant diseases fall into four groups: (1) change in color: yellowing, green and yellow mottling, and vein clearing; (2) malformations: distortion of leaves and flowers, rosetting, proliferation and witches'-brooms (abnormal proliferation of shoots), and little or no leaf development between the veins; (3) necrosis: leaf spots, ring spots, streaks, wilting or drooping, and internal death, especially of phloem (food-conducting) tissue; and (4) stunting or dwarfing of leaves, stems, or entire plants. Control is accomplished by several methods, such as growing resistant species and varieties of plants or obtaining virus-free seed, cuttings, or plants. Further control measures include controlling insect vectors by spraying plants with contact insecticides or fumigating soil to kill insects, nematodes, and other possible vectors. It also includes spraying leaves of plants with oils like mineral oil and paraffin, which helps to prevent viral propagation during insect infestation of growing plants.

A great many of the current pest control formulations, contain antimicrobial agents which are not naturally occurring. Typical antimicrobial agents include chemical disinfectants such as phenolic compounds, quaternary ammonium compounds, formaldehyde and halogen containing compounds. Such materials are not of natural origin (i.e. not found in nature) and are prepared through chemical processing and synthesis. A great many of these "synthetic" disinfectants cause undesirable effects on both the environment and on human health. The interaction of any synthetic chemical disinfectants, let alone a number of such chemicals with the environment always comes with unexpected consequences.

The non-selective way in which synthetic chemical disinfectants control pests also makes them undesirable. The chemicals can often have unexpected and serious detrimental effects on desirable insects or animals as well as the pest insect or animal.

Because of the often detrimental effects of synthetic chemical disinfectants a number of alternatives have been proposed and researched. One such alternative is the use of natural disinfectants or pesticides. Natural disinfectants or pesticides are compounds that exist in nature (e.g. in plants, animals, or other insects) and have properties that allow them to be used as is, combined, or modified to be used as disinfectants or pesticides.

Although natural pesticides have previously been utilized, there still remains a need for effective natural pesticides that do not have the undesirable effects often exhibited by synthetic chemical pesticides.

There is therefore a need for compositions for controlling pests, for plant regulation, or both, that reduce or at least mitigate the drawbacks of the prior art.

SUMMARY

According to an embodiment, there is provided a composition for regulating plant growth comprising:
a pesticide composition consisting of:
- a) from about 0.01% to about 25% weight of at least one antimicrobial isolated or synthetic phenolic compound of natural origin selected from the group consisting of thymol and/or carvacrol;
- b) from about 0.001% to about 15% weight of an anionic, a cationic, an amphoteric, an non-ionic surfactant, or combinations thereof, sufficient to form a solution or dispersion of the phenolic compound in an aqueous carrier;
- c) from about 0.001% to about 40% weight of a solvent;
- d) sufficient water to make 100 weight percent, and a supplement comprising
at least one of a pesticide, a fertilizer, a defoamer, a plant growth regulator, or combinations thereof.

The antimicrobial compound may be of synthetic origin.

The surfactant may be selected from the group consisting of an anionic surfactant, a cationic surfactant, an amphoteric surfactant, a non-ionic surfactant, and combinations thereof.

The at least one antimicrobial compound may be from about 0.12% to about 1.15% w/w of the composition.

The at least one antimicrobial compound may be from about 0.12% w/w, or about 0.23% w/w, or about 0.46% w/w, or about 1.15% w/w of the composition.

The surfactant may be from about 0.1% to about 15% (w/w) of the formulation.

The solvent may be from about 0.1% to about 40% (w/w) of the formulation.

The pesticide may be chosen from an algicide, an anti-fouling agent, a disinfectant, a fungicide, a fumigant, an herbicide, a molluscicide, an ovicide, a rodenticide, an insect growth a bactericide, a virucide, an insect repellent, an arthropod repellent, a nematicide, an insecticide, an acaricide, an herbicide, and a plant growth regulator.

The fertilizer may be chosen from fertilizers an inorganic fertilizer, a nitrogen fertilizer, a potassium fertilizer, a phosphate fertilizer, an organic fertilizer, a manure, a compost, a rock phosphate, a bone meal, an alfalfa, a wood chip, a langbeinite, a cover crops, potassium sulfate, a rock powder, ash, a blood meal, a fish meal, a fish emulsion, an algae, a chitosan and a molasse.

The defoamer may be chosen from a mineral oil, a vegetable oil, a paraffin wax, an ester wax, a silica, a fatty alcohol, a silicone, a polyethylene glycol, a polypropylene glycol, copolymer, and an alkyl polyacrylate.

The plant growth regulator may be chosen from a carbamate, a chlorinated hydrocarbon, cyclohexadione, an organic acid, ancymidol, ethephon, gibberelic acid, gibberellins and benazladenine, maleic hydrazide, NAA, napthalene acetamide, paclobutrazol, N-acetylaspartic acid.

The supplement further comprises a colorant, a pH adjusting agent, a sequestering agent, and combinations thereof.

According to another embodiment, there is provided a method for the control of pests, the method comprising contacting a soil, a seed, a plant, or combinations thereof, with a pesticidal amount of the composition of the present invention to control the pest.

According to another embodiment, there may be provided a method for the control of pests, the method comprising contacting a soil, a seed, a plant, or combinations thereof, with a pesticidal amount of a pesticide composition consisting of:
- a) from about 0.01% to about 25% by weight of at least one antimicrobial compound selected from the group consisting of thymol and carvacrol;
- b) from about 0.001% to about 15% by weight of surfactant sufficient to form a solution or dispersion of the phenolic compound in an aqueous carrier;
- c) from about 0.001% to about 40% by weight of a solvent; and
- d) sufficient water to make 100 weight percent.

The antimicrobial compound may be of synthetic origin.

The surfactant may be selected from the group consisting of an anionic surfactant, a cationic surfactant, an amphoteric surfactant, a non-ionic surfactant, and combinations thereof.

The at least one antimicrobial compound may be from about 0.12% to about 1.15% w/w of the composition.

The at least one antimicrobial compound may be from about 0.12% w/w, or about 0.23% w/w, or about 0.46% w/w, or about 1.15% w/w of the composition.

The surfactant may be from about 0.1% to about 15% (w/w) of the formulation.

The solvent may be from about 0.1% to about 40% (w/w) of the formulation.

The pest may be chosen from an insect, a nematode, a fungi, a bacteria, a larvae, a plant, an animal, a virus, a parasite, a gastropod, an arthropod, a snail, a slug, an algae, or combinations thereof.

The plant may be a weed. The arthropod may be a mite. The insect may be a moth. The bacteria may be chosen from an *E. Amylovora*, an *E. coli* or a combination thereof.

According to another embodiment, there is provided a method for regulating the growth of a plant, the method comprising contacting a soil, a seed, a plant, or combinations thereof, with a growth regulating amount of a composition according to the present invention.

According to another embodiment, there is provided a method for regulating the growth of a plant, the method comprising contacting a soil, a seed, a plant, or combinations thereof, with a growth regulating amount of a pesticide composition consisting of:
- a) from about 0.01% to about 25% by weight of at least one antimicrobial compound selected from the group consisting of thymol and carvacrol;
- b) from about 0.001% to about 15% by weight of surfactant sufficient to form a solution or dispersion of the phenolic compound in an aqueous carrier;
- c) from about 0.001% to about 40% by weight of a solvent; and
- d) sufficient water to make 100 weight percent.

The antimicrobial compound may be of synthetic origin.

The surfactant may be selected from the group consisting of an anionic surfactant, a cationic surfactant, an amphoteric surfactant, a non-ionic surfactant, and combinations thereof.

The at least one antimicrobial compound may be from about 0.12% to about 1.15% w/w of the composition.

The at least one antimicrobial compound may be from about 0.12% w/w, or about 0.23% w/w, or about 0.46% w/w, or about 1.15% w/w of the composition.

The surfactant may be from about 0.1% to about 15% (w/w) of the formulation.

The solvent may be from about 0.1% to about 40% (w/w) of the formulation.

The regulating the growth may comprise an increase in the number of fruit, vegetable, bulb or tuber from the plant.

The regulating the growth may comprise an increase in the size of fruit, vegetable, bulb or tuber from the plant.

The regulating the growth may comprise an increase in the number of healthy plants.

The plant may be chosen from a banana plant, an apple tree, a pear tree, a potato plant, a rice plant, a coffea plant, a citrus tree, an onion, ginseng, soy, a weed, a tomato plant.

According to another embodiment, there is provided a method for regulating the growth of a seed, the method comprising contacting a seed or a soil containing the seed thereof, with a growth regulating amount of a composition according to the present invention.

According to another embodiment, there is provided a method for regulating the growth of a seed, the method comprising contacting a seed or a soil containing the seed thereof, with a growth regulating amount of a pesticide composition consisting of:
  a) from about 0.01% to about 25% by weight of at least one antimicrobial compound selected from the group consisting of thymol and carvacrol;
  b) from about 0.001% to about 15% by weight of surfactant sufficient to form a solution or dispersion of the phenolic compound in an aqueous carrier;
  c) from about 0.001% to about 40% by weight of a solvent; and
  d) sufficient water to make 100 weight percent.

The antimicrobial compound may be of synthetic origin.

The surfactant may be selected from the group consisting of an anionic surfactant, a cationic surfactant, an amphoteric surfactant, a non-ionic surfactant, and combinations thereof.

The at least one antimicrobial compound may be from about 0.12% to about 1.15% w/w of the composition.

The at least one antimicrobial compound may be from about 0.12% w/w, or about 0.23% w/w, or about 0.46% w/w, or about 1.15% w/w of the composition.

The surfactant may be from about 0.1% to about 15% (w/w) of the formulation.

The solvent may be from about 0.1% to about 40% (w/w) of the formulation.

The seed may be a tuber.

The tuber may be from a potato (kumara), a sweet potato, a yam, a cassava, and a dahilia.

The regulating the growth may comprise an increase in the length of a tuber sprout.

The following terms are defined below.

Before describing the present invention in detail, a number of terms will be defined. As used herein, the singular forms "a", "an", and "the" include plural referents unless the context clearly dictates otherwise.

The use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

The term "about" is used to indicate that a value includes an inherent variation of error for the device or the method being employed to determine the value.

Weight percent, percent by weight, % by weight, wt %, and the like are synonyms that refer to the concentration of a substance as the weight of that substance divided by the weight of the composition and multiplied by 100.

It is noted that terms like "preferably", "commonly", and "typically" are not utilized herein to limit the scope of the claimed invention or to imply that certain features are critical, essential, or even important to the structure or function of the claimed invention. Rather, these terms are merely intended to highlight alternative or additional features that can or cannot be utilized in a particular embodiment of the present invention.

For the purposes of describing and defining the present invention it is noted that the term "substantially" is utilized herein to represent the inherent degree of uncertainty that can be attributed to any quantitative comparison, value, measurement, or other representation. The term "substantially" is also utilized herein to represent the degree by which a quantitative representation can vary from a stated reference without resulting in a change in the basic function of the subject matter at issue.

The term <<composition>> as used herein is intended to encompass a product comprising the specified ingredients in the specified amounts, as well as any product which results, directly or indirectly, from combination of the specified ingredients in the specified amounts. Such term in relation to pharmaceutical composition or other compositions in general, is intended to encompass a product comprising the active ingredient(s) and the inert ingredient(s) that make up the carrier, as well as any product which results, directly or indirectly, from combination, complexation or aggregation of any two or more of the ingredients, or from dissociation of one or more of the ingredients, or from other types of reactions or interactions of one or more of the ingredients. Accordingly, the pharmaceutical compositions or other compositions in general of the present invention encompass any composition made by admixing a compound of the present invention and a pharmaceutically acceptable carrier. By "pharmaceutically acceptable" or "acceptable" it is meant the carrier, diluent or excipient must be compatible with the other ingredients of the formulation and not deleterious to the recipient thereof.

The terms "regulating plant growth" and "growth regulation amount" are intended to mean that the method and composition of the present invention regulate at least one aspect of the growth of a plant. The regulation of growth does not need to be on all aspects of plant growth. For example, the composition of the present invention may regulate the growth of any one of the foliage, leaves, flowers, stems, branches, fruits, vegetables, bulb, tubers, or any other part of the plant, independently from other parts of the plant. As used herein, the term "growth regulating amount" is intended to mean an amount of the composition of the present invention that causes at least one of the aspects of the growth of a plant to be regulated as defined above. The regulation of plant growth may also include an overall increase on the growth of a plant. The regulation of plant growth may also show as an increase in the number of healthy plants in a culture of plants comprising several individuals. The regulation of plant growth may also include stimulation of fruit ripening. The regulation of plant growth may also include inhibition of plant growth and shoot growth. The regulation of plant growth may also include an increase in flowering. The regulation of plant growth may also include the regulation of leaf and fruit senescence. The growth regulating amount may span a range of concentration over which the effect may be observed, and each growth regulating effects may be observed at the detriment of the growth of other parts of the plant. Preferably, the growth regulating effect may be obtained without any phytotoxic effects to the remainder of the plants, but in some embodiments this may not be possible.

The term "pesticidal amount" to mean an amount of the composition of the present invention that will be sufficient to control a given pest. This, the amount may vary according to the targeted pest, which implies that a lower concentration may be sufficient to control one pest, and that a higher concentration may be required to control another pest.

The terms "fruit" and "vegetable" are intended to mean the common language usage of "fruit" and "vegetable" which normally means the fleshy seed-associated structures of a plant that are sweet or sour, and edible in the raw state, such as apples, bananas, grapes, lemons, oranges, and strawberries. It also includes the botanical usage of "fruit" and "vegetable" which includes many structures that are not commonly called "fruits" or "vegetable", such as bean pods, corn kernels, tomatoes, and wheat grains.

The term "tuber" is intended to mean the enlarged structures in some plant species used as storage organs for nutrients. They are used for the plant's perennation (survival of the winter or dry months), to provide energy and nutrients for regrowth during the next growing season, and as a means of asexual reproduction. Stem tubers form from thickened rhizomes (underground stems) or stolons (horizontal connections between organisms). Common plant species with stem tubers include potato and yam. Some sources also treat modified lateral roots, (root tubers) under the definition; these are encountered in sweet potato, cassava, and dahlia.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature, and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which.

DETAILED DESCRIPTION

Figure 1:
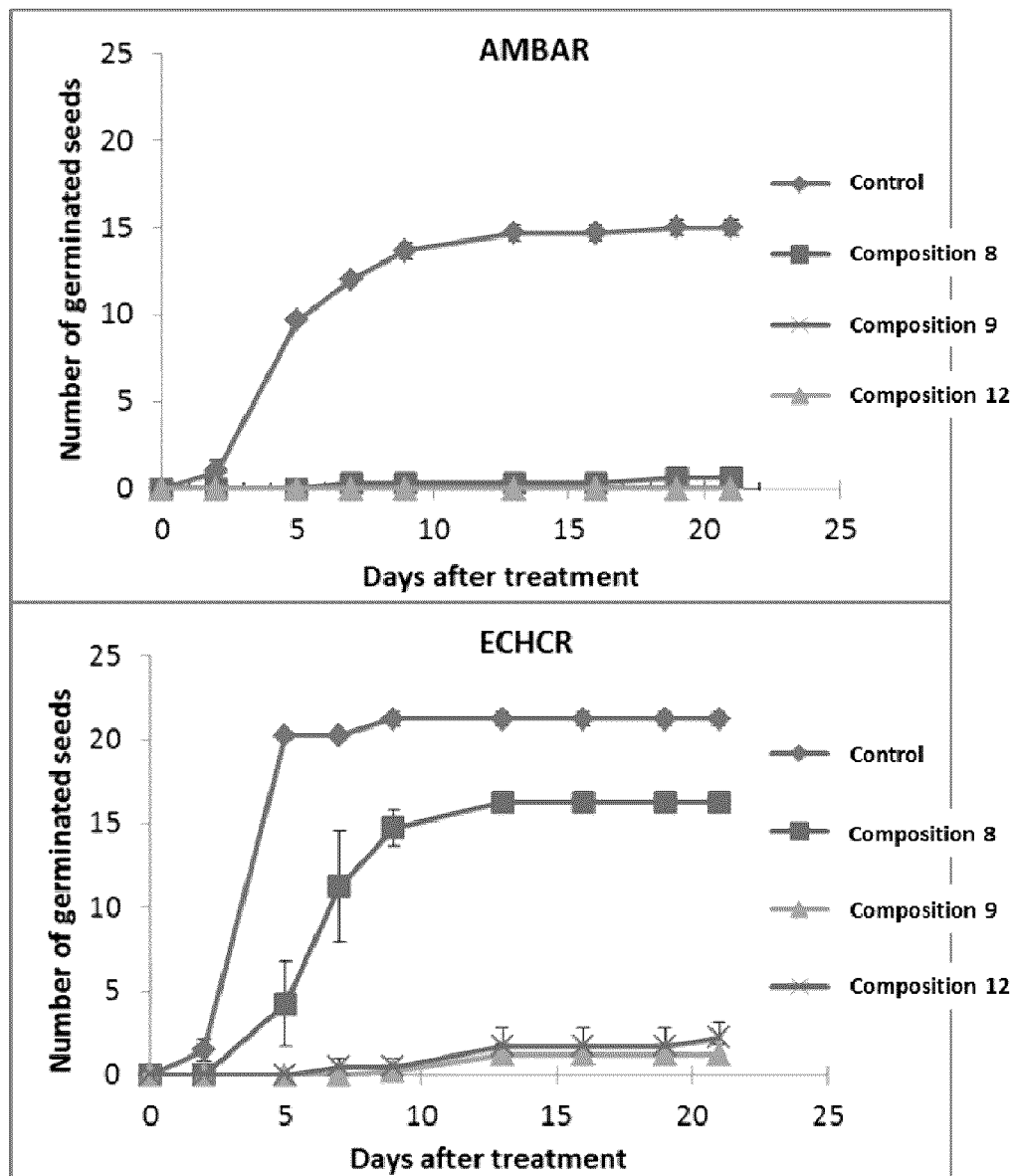
FIG. 1 illustrates the cumulative germination of common ragweed (AMBAR) and barnyard grass (ECHCR) for the different compositions during 21 days in Petri dishes. Vertical bars represent ±SE

In a first embodiment there is disclosed a composition for regulating plant growth comprising:
a pesticide composition which consists of:
  a) from about 0.01% to about 25% weight of at least one antimicrobial isolated or synthetic phenolic compound of natural origin selected from the group consisting of thymol and/or carvacrol;
  b) from about 0.001% to about 15% weight of an anionic, a cationic, an amphoteric, an non-ionic surfactant, or combinations thereof, sufficient to form a solution or dispersion of the phenolic compound in an aqueous carrier;
  c) from about 0.001% to about 40% weight of a solvent;
  d) sufficient water to make 100 weight percent,
and a supplement comprising:
at least one of a pesticide, a fertilizer, a defoamer, a plant growth regulator, or combinations thereof.

Compositions of the Present Invention

The phenolic compounds of natural origin as used in the present invention can be synthetically made by known methods within the capacity of a skilled technician, or can be obtained from plant oil extracts. In an embodiment of the present invention, the phenolic compounds of natural origin are obtained from plant extracts. In a further embodiment of the present invention, the phenolic compounds of natural origin are commercially available. In yet a further embodiment of the present invention, the phenolic compounds of natural origin comprise carvacrol and thymol.

In an embodiment, the pesticide compositions of the present invention comprise thymol, carvacrol or mixtures thereof. In a further embodiment, the pesticide compositions of the present invention comprise one or more natural essential oils enriched in thymol, carvacrol or mixtures of thymol and carvacrol.

In an embodiment, the pesticide compositions of the present invention further comprise a surfactant. A surfactant operative herein comprises a water soluble or water dispersible nonionic, anionic, cationic, or an amphoteric compound. In a further embodiment, the pesticide compositions of the present invention comprise one or more of the conventional anionic surfactants known in the art. A representative listing of surfactants and properties thereof is detailed in Remington's Pharmaceutical Sciences, $17^{th}$ edition (Mack Publishing Company). Non-limiting examples of surfactants according to an embodiment of the present invention include sodium lauryl sulfate, sorbitan stearate, sorbitan esters, sodium laureth sulfate, sarkosyl, cocamidopropyl betaine (CAPB), sodium lauryl ether sulfonate, alkyl benzene sulfonates, nonylphenol ethoxylate, ether ethoxylate, as well as the surfactants listed in Table 9 below. It is appreciated that one or more additional surfactants may be included in the pesticide compositions of the present invention. A surfactant (surface active agent) is generally intended to refer to a substance which when dissolved in water, or other aqueous system, reduces the surface or interfacial tension between it and another substance or material. In an embodiment of the present invention, the surfactant aids in the dispersion or emulsification of the essential oils within the aqueous carrier. According to an embodiment, the dispersion is not necessarily and homogenous dispersion. The dispersion may necessitate agitation and/or shaking prior to use. According to another embodiment, the dispersion is a homogenous dispersion. In a further embodiment of the present invention, the anionic surfactant aids in braking down the structure of biofilms through denaturation. In yet a further embodiment, the surfactant acts as a "wetting" agent. Wetting agents typically reduce the surface tension of the water molecules, allowing for a greater spreading of the solution and a deeper penetration into small crack and crevices of the surface to be treated.

In embodiments, the composition of the present invention comprises from about 0.1% to about 15% w/w surfactant, or from about 0.5% to about 15% w/w, or from about 1% to about 15% w/w, or from about 2% to about 15% w/w, or from about 3% to about 15% w/w, or from about 4% to about 15% w/w, or from about 5% to about 15% w/w, or from about 7.5% to about 15% w/w, or from about 10% to about 15% w/w, or from about 12.5% to about 15% w/w, 0.1% to about 12.5% w/w surfactant, or from about 0.5% to about 12.5% w/w, or from about 1% to about 12.5% w/w, or from about 2% to about 12.5% w/w, or from about 3% to about 12.5% w/w, or from about 4% to about 12.5% w/w, or from about 5% to about 12.5% w/w, or from about 7.5% to about 12.5% w/w, or from about 10% to about 12.5% w/w, 0.1% to about 10% w/w surfactant, or from about 0.5% to about 10% w/w, or from about 1% to about 10% w/w, or from about 2% to about 10% w/w, or from about 3% to about 10% w/w, or from about 4% to about 10% w/w, or from about 5% to about 10% w/w, or from about 7.5% to about 10% w/w, 0.1% to about 7.5% w/w surfactant, or from about 0.5% to about 7.5% w/w, or from about 1% to about 7.5% w/w, or from about 2% to about 7.5% w/w, or from about 3% to about 7.5% w/w, or from about 4% to about 7.5% w/w, or from about 5% to about 7.5% w/w, 0.1% to about 5% w/w surfactant, or from about 0.5% to about 5% w/w, or from about 1% to about 5% w/w, or from about 2% to about 5% w/w, or from about 3% to about 5% w/w, or from about 4% to about 5% w/w, 0.1% to about 4% w/w surfactant, or from about 0.5% to about 4% w/w, or from about 1% to about 4% w/w, or from about 2% to about 4% w/w, or from about 3% to about 4% w/w, 0.1% to about 3% w/w surfactant, or from about 0.5% to about 3% w/w, or from about 1% to about 3% w/w, or from about 2% to about 3% w/w, 0.1% to about 2% w/w surfactant, or from about 0.5% to about 2% w/w, or from about 1% to about 2% w/w, 0.1% to about 1% w/w surfactant, or from about 0.5% to about 1% w/w, 0.1% to about 0.5% w/w surfactant.

Phenolic compounds (e.g. carvacrol, thymol) are typically not sufficiently soluble in an aqueous medium. The pesticide compositions of the present invention thus typically comprise a solvent. The solvents may be hydrophilic, hydrophobic or amphiphilic in nature. In an embodiment, the pesticide compositions of the present invention comprise an amphiphilic solvent. Amphiphilic solvents are capable of solubilizing the phenolic compounds of natural origin and/or the essential oil(s) in the aqueous carrier. Non-limiting examples of solvents according to an embodiment of the present invention include methanol, ethanol, hexadecane, propylene glycol, propylene glycol n-butyl ether, propylene glycol methyl ether acetate, propylene glycol methyl ether, dipropylene glycol n-propyl ether, ethylene glycol methyl ether and hexylene glycol. The addition of a significant amount of solvent to the pesticide solutions of the present invention, allows for the solutions to be used at temperatures slightly inferior to 0° C. It is well within the capacity of a skilled technician to determine such amounts of solvent. In embodiments, the composition of the present invention comprises from about 0.1% to about 40% w/w solvent, or from about 0.5% to about 40% w/w, or from about 1% to about 40% w/w, or from about 5% to about 40% w/w, or from about 10% to about 40% w/w, or from about 15% to about 40% w/w, or from about 20% to about 40% w/w, or from about 25% to about 40% w/w, or from about 30% to about 40% w/w, or from about 35% to about 40% w/w, or from about 0.1% to about 35% w/w solvent, or from about 0.5% to about 35% w/w, or from about 1% to about 35% w/w, or from about 5% to about 35% w/w, or from about 10% to about 35% w/w, or from about 15% to about 35% w/w, or from about 20% to about 35% w/w, or from about 25% to about 35% w/w, or from about 30% to about 35% w/w, or from about 0.1% to about 30% w/w solvent, or from about 0.5% to about 30% w/w, or from about 1% to about 30% w/w, or from about 5% to about 30% w/w, or from about 10% to about 30% w/w, or from about 15% to about 30% w/w, or from about 20% to about 30% w/w, or from about 25% to about 30% w/w, or from about 0.1% to about 25% w/w solvent, or from about 0.5% to about 25% w/w, or from about 1% to about 25% w/w, or from about 5% to about 25% w/w, or from about 10% to about 25% w/w, or from about 15% to about 25% w/w, or from about 20% to about 25% w/w, or from about 0.1% to about 20% w/w solvent, or from about 0.5% to about 20% w/w, or from about 1% to about 20% w/w, or from about 5% to about 20% w/w, or from about 10% to about 20% w/w, or from about 15% to about 20% w/w, or from about 0.1% to about 15% w/w solvent, or from about 0.5% to about 15% w/w, or from about 1% to about 15% w/w, or from about 5% to about 15% w/w, or from about 10% to about 15% w/w, or 0.1% to about 10% w/w solvent, or from about 0.5% to about 10% w/w, or from about 1% to about 10% w/w, or from about 5% to about 10% w/w, or from about 0.1% to about 5% w/w solvent, or from about 0.5% to about 5% w/w, or from about 1% to about 5% w/w, or from about 0.1% to about 1% w/w solvent, or from about 0.5% to about 1% w/w, or from about 0.1% to about 0.5% w/w solvent.

Since the disinfectant compositions are typically prepared on site from mixtures of ingredients in concentrated solution, tap water is used for dilution. Tap water generally has a certain amount of hardness. Since the presence of dissolved minerals (e.g. $Ca^{++}$, $Mg^{++}$) may adversely affect the performance and properties of the disinfectant composition, a sequestering agent is included in the composition to chelate the dissolved minerals in the form of a water soluble complex. Sequestering agents are well known in the art. Non-limiting examples include ethylene diamine tetraacetic acid (EDTA) sodium salt, sodium gluconate, sodium citrate, trisodium ethylenediamine disuccinate, citric acid, trisodium NTA, sodium phosphate and sodium choleate. Sequestering agents typically prevent the dissolved minerals from binding to the surfactant molecules. Moreover, sequestering agents may remove minerals from the surface to be disinfected.

In an embodiment, the pesticide compositions of the present invention comprise one or more phenolic compounds of natural origin. In an embodiment of the present invention, the phenolic compounds are selected from the group consisting of thymol and carvacrol. In a further embodiment, the pesticide compositions of the present invention comprise carvacrol. In a further embodiment, the pesticide compositions of the present invention comprise thymol. In a further embodiment, the pesticide compositions of the present invention comprise carvacrol and thymol.

In embodiments, the composition of the present invention comprises from about 0.01% to about 25% w/w, or from about 0.02% to about 25%, or from about 0.03% to about 25%, or from about 0.04% to about 25%, or from about 0.05% to about 25%, or from about 0.06% to about 25%, or from about 0.07% to about 25%, or from about 0.08% to about 25%, or from about 0.09% to about 25%, or from about 0.10% to about 25%, or from about 0.11% to about 25%, or from about 0.12% to about 25%, or from about 0.13% to about 25%, or from about 0.14% to about 25%, or from about 0.15% to about 25%, or from about 0.16% to about 25%, or from about 0.17% to about 25%, or from about 0.18% to about 25%, or from about 0.19% to about 25%, or from about 0.20% to about 25%, or from about 0.21% to about 25%, or from about 0.22% to about 25%, or from about 0.23% to about 25%, or from about 0.24% to about 25%, or from about 0.25% to about 25%, or from about 0.26% to about 25%, or from about 0.27% to about 25%, or from about 0.28% to about 25%, or from about 0.29% to about 25%, or from about 0.30% to about 25%, or from about 0.31% to about 25%, or from about 0.32% to about 25%, or from about 0.33% to about 25%, or from about 0.34% to about 25%, or from about 0.35% to about 25%, or from about 0.36% to about 25%, or from about 0.37% to about 25%, or from about 0.38% to about 25%, or from about 0.39% to about 25%, or from about 0.40% to about 25%, or from about 0.41% to about 25%, or from about 0.42% to about 25%, or from about 0.43% to about 25%, or from about 0.44% to about 25%, or from about 0.45% to about 25%, or from about 0.46% to about 25%, or from about 0.50% to about 25%, or from about 0.55% to about 25%, or from about 0.60% to about 25%, or from about 0.65% to about 25%, or from about 0.70% to about 25%, or from about 0.75% to about 25%, or from about 0.80% to about 25%, or from about 0.85% to about 25%, or from about 0.90% to about 25%, or from about 0.95% to about 25%, or from about 1.0% to about 25%, or from about 1.05% to about 25%, or from about 1.10% to about 25%, or from about 1.15% to about 25%, or from about 1.20% to about 25%, or from about 1.25% to about 25%, or from about 1.50% to about 25%, or from about 3% to about 25%, or from about 5% to about 25%, or from about 10% to about 25%, or from about 15% to about 25%, or from about 20% to about 25%, from about 0.01% to about 20% w/w, or from about 0.02% to about 20%, or from about 0.03% to about 20%, or from about 0.04% to about 20%, or from about 0.05% to about 20%, or from about 0.06% to about 20%, or from about 0.07% to about 20%, or from about 0.08% to about 20%, or from about 0.09% to about 20%, or from about 0.10% to about 20%, or from about 0.11% to about 20%, or from about 0.12% to about 20%, or from about 0.13% to about 20%, or from about 0.14% to about 20%, or from about 0.15% to about 20%, or from about 0.16% to about 20%, or from about 0.17% to about 20%, or from about 0.18% to about 20%, or from about 0.19% to about 20%, or from about 0.20% to about 20%, or from about 0.21% to about 20%, or from about 0.22% to about 20%, or from about 0.23% to about 20%, or from about 0.24% to about 20%, or from about 0.25% to about 20%, or from about 0.26% to about 20%, or from about 0.27% to about 20%, or from about 0.28% to about 20%, or from about 0.29% to about 20%, or from about 0.30% to about 20%, or from about 0.31% to about 20%, or from about 0.32% to about 20%, or from about 0.33% to about 20%, or from about 0.34% to about 20%, or from about 0.35% to about 20%, or from about 0.36% to about 20%, or from about 0.37% to about 20%, or from about 0.38% to about 20%, or from about 0.39% to about 20%, or from about 0.40% to about 20%, or from about 0.41% to about 20%, or from about 0.42% to about 20%, or from about 0.43% to about 20%, or from about 0.44% to about 20%, or from about 0.45% to about 20%, or from about 0.46% to about 20%, or from about 0.50% to about 20%, or from about 0.55% to about 20%, or from about 0.60% to about 20%, or from about 0.65% to about 20%, or from about 0.70% to about 20%, or from about 0.75% to about 20%, or from about 0.80% to about 20%, or from about 0.85% to about 20%, or from about 0.90% to about 20%, or from about 0.95% to about 20%, or from about 1.0% to about 20%, or from about 1.05% to about 20%, or from about 1.10% to about 20%, or from about 1.15% to about 20%, or from about 1.20% to about 20%, or from about 1.25% to about 20%, or from about 1.50% to about 20%, or from about 3% to about 20%, or from about 5% to about 20%, or from about 10% to about 20%, or from about 15% to about 20%, from about 0.01% to about 15% w/w, or from about 0.02% to about 15%, or from about 0.03% to about 15%, or from about 0.04% to about 15%, or from about 0.05% to about 15%, or from about 0.06% to about 15%, or from about 0.07% to about 15%, or from about 0.08% to about 15%, or from about 0.09% to about 15%, or from about 0.10% to about 15%, or from about 0.11% to about 15%, or from about 0.12% to about 15%, or from about 0.13% to about 15%, or from about 0.14% to about 15%, or from about 0.15% to about 15%, or from about 0.16% to about 15%, or from about 0.17% to about 15%, or from about 0.18% to about 15%, or from about 0.19% to about 15%, or from about 0.20% to about 15%, or from about 0.21% to about 15%, or from about 0.22% to about 15%, or from about 0.23% to about 15%, or from about 0.24% to about 15%, or from about 0.25% to about 15%, or from about 0.26% to about 15%, or from about 0.27% to about 15%, or from about 0.28% to about 15%, or from about 0.29% to about 15%, or from about 0.30% to about 15%, or from about 0.31% to about 15%, or from about 0.32% to about 15%, or from about 0.33% to about 15%, or from about 0.34% to about 15%, or from about 0.35% to about 15%, or from about 0.36% to about 15%, or from about 0.37% to about 15%, or from about 0.38% to about 15%, or from about 0.39% to about 15%, or from about 0.40% to about 15%, or from about 0.41% to about 15%, or from about 0.42% to about 15%, or from about 0.43% to about 15%, or from about 0.44% to about 15%, or from about 0.45% to about 15%, or from about 0.46% to about 15%, or from about 0.50% to about 15%, or from about 0.55% to about 15%, or from about 0.60% to about 15%, or from about 0.65% to about 15%, or from about 0.70% to about 15%, or from about 0.75% to about 15%, or from about 0.80% to about 15%, or from about 0.85% to about 15%, or from about 0.90% to about 15%, or from about 0.95% to about 15%, or from about 1.0% to about 15%, or from about 1.05% to about 15%, or from about 1.10% to about 15%, or from about 1.15% to about 15%, or from about 1.20% to about 15%, or from about 1.25% to about 15%, or from about 1.50% to about 15%, or from about 3% to about 15%, or from about 5% to about 15%, or from about 10% to about 15%, from about 0.01% to about 10% w/w, or from about 0.02% to about 10%, or from about 0.03% to about 10%, or from about 0.04% to about 10%, or from about 0.05% to about 10% w/w, or from about 0.06% to about 10%, or from about 0.07% to about 10%, or from about 0.08% to about 10%, or from about 0.09% to about 10%, or from about 0.10% to about 10%, or from about 0.11% to about 10%, or from about 0.12% to about 10%, or from about 0.13% to about 10%, or from about 0.14% to about 10%, or from about 0.15% to about 10%, or from about 0.16% to about 10%, or from about 0.17% to about 10%, or from about 0.18% to about 10%, or from about 0.19% to about 10%, or from about 0.20% to about 10%, or from about 0.21% to about 10%, or from about 0.22% to about 10%, or from about 0.23% to about 10%, or from about 0.24% to about 10%, or from about 0.25% to about 10%, or from about 0.26% to about 10%, or from about 0.27% to about 10%, or from about 0.28% to about 10%, or from about 0.29% to about 10%, or from about 0.30% to about 10%, or from about 0.31% to about 10%, or from about 0.32% to about 10%, or from about 0.33% to about 10%, or from about 0.34% to about 10%, or from about 0.35% to about 10%, or from about 0.36% to about 10%, or from about 0.37% to about 10%, or from about 0.38% to about 10%, or from about 0.39% to about 10%, or from about 0.40% to about 10%, or from about 0.41% to about 10%, or from about 0.42% to about 10%, or from about 0.43% to about 10%, or from about 0.44% to about 10%, or from about 0.45% to about 10%, or from about 0.46% to about 10%, or from about 0.50% to about 10%, or from about 0.55% to about 10%, or from about 0.60% to about 10%, or from about 0.65% to about 10%, or from about 0.70% to about 10%, or from about 0.75% to about 10%, or from about 0.80% to about 10%, or from about 0.85% to about 10%, or from about 0.90% to about 10%, or from about 0.95% to about 10%, or from about 1.0% to about 10%, or from about 1.05% to about 10%, or from about 1.10% to about 10%, or from about 1.15% to about 10%, or from about 1.20% to about 10%, or from about 1.25% to about 10%, or from about 1.50% to about 10%, or from about 3% to about 10%, or from about 5% to about 10%, from about 0.01% to about 5% w/w, or from about 0.02% to about 5%, or from about 0.03% to about 5%, or from about 0.04% to about 5%, or from about 0.05% to about 5%, or from about 0.06% to about 5%, or from about 0.07% to about 5%, or from about 0.08% to about 5%, or from about 0.09% to about 5%, or from about 0.10% to about 5%, or from about 0.11% to about 5%, or from about 0.12% to about 5%, or from about 0.13% to about 5%, or from about 0.14% to about 5%, or from about 0.15% to about 5%, or from about 0.16% to about 5%, or from about 0.17% to about 5%, or from about 0.18% to about 5%, or from about 0.19% to about 5%, or from about 0.20% to about 5%, or from about 0.21% to about 5%, or from about 0.22% to about 5%, or from about 0.23% to about 5%, or from about 0.24% to about 5%, or from about 0.25% to about 5%, or from about 0.26% to about 5%, or from about 0.27% to about 5%, or from about 0.28% to about 5%, or from about 0.29% to about 5%, or from about 0.30% to about 5%, or from about 0.31% to about 5%, or from about 0.32% to about 5%, or from about 0.33% to about 5%, or from about 0.34% to about 5%, or from about 0.35% to about 5%, or from about 0.36% to about 5%, or from about 0.37% to about 5%, or from about 0.38% to about 5%, or from about 0.39% to about 5%, or from about 0.40% to about 5%, or from about 0.41% to about 5%, or from about 0.42% to about 5%, or from about 0.43% to about 5%, or from about 0.44% to about 5%, or from about 0.45% to about 5%, or from about 0.46% to about 5%, or from about 0.50% to about 5%, or from about 0.55% to about 5%, or from about 0.60% to about 5%, or from about 0.65% to about 5%, or from about 0.70% to about 5%, or from about 0.75% to about 5%, or from about 0.80% to about 5%, or from about 0.85% to about 5%, or from about 0.90% to about 5%, or from about 0.95% to about 5%, or from about 1.0% to about 5%, or from about 1.05% to about 5%, or from about 1.10% to about 5%, or from about 1.15% to about 5%, or from about 1.20% to about 5%, or from about 1.25% to about 5%, or from about 1.50% to about 5%, or from about 3% to about 5%, from about 0.01% to about 3% w/w, or from about 0.02% to about 3%, or from about 0.03% to about 3%, or from about 0.04% to about 3%, or from about 0.05% to about 3% w/w, or from about 0.06% to about 3%, or from about 0.07% to about 3%, or from about 0.08% to about 3%, or from about 0.09% to about 3%, or from about 0.10% to about 3%, or from about 0.11% to about 3%, or from about 0.12% to about 3%, or from about 0.13% to about 3%, or from about 0.14% to about 3%, or from about 0.15% to about 3%, or from about 0.16% to about 3%, or from about 0.17% to about 3%, or from about 0.18% to about 3%, or from about 0.19% to about 3%, or from about 0.20% to about 3%, or from about 0.21% to about 3%, or from about 0.22% to about 3%, or from about 0.23% to about 3%, or from about 0.24% to about 3%, or from about 0.25% to about 3%, or from about 0.26% to about 3%, or from about 0.27% to about 3%, or from about 0.28% to about 3%, or from about 0.29% to about 3%, or from about 0.30% to about 3%, or from about 0.31% to about 3%, or from about 0.32% to about 3%, or from about 0.33% to about 3%, or from about 0.34% to about 3%, or from about 0.35% to about 3%, or from about 0.36% to about 3%, or from about 0.37% to about 3%, or from about 0.38% to about 3%, or from about 0.39% to about 3%, or from about 0.40% to about 3%, or from about 0.41% to about 3%, or from about 0.42% to about 3%, or from about 0.43% to about 3%, or from about 0.44% to about 3%, or from about 0.45% to about 3%, or from about 0.46% to about 3%, or from about 0.50% to about 3%, or from about 0.55% to about 3%, or from about 0.60% to about 3%, or from about 0.65% to about 3%, or from about 0.70% to about 3%, or from about 0.75% to about 3%, or from about 0.80% to about 3%, or from about 0.85% to about 3%, or from about 0.90% to about 3%, or from about 0.95% to about 3%, or from about 1.0% to about 3%, or from about 1.05% to about 3%, or from about 1.10% to about 3%, or from about 1.15% to about 3%, or from about 1.20% to about 3%, or from about 1.25% to about 3%, or from about 1.50% to about 3%, from about 0.01 to about 1.5% w/w, or from about 0.02% to about 1.5%, or from about 0.03% to about 1.5%, or from about 0.04% to about 1.5%, or from about 0.05% to about 1.5% w/w, or from about 0.06% to about 1.5%, or from about 0.07% to about 1.5%, or from about 0.08% to about 1.5%, or from about 0.09% to about 1.5%, or from about 0.10% to about 1.5%, or from about 0.11% to about 1.5%, or from about 0.12% to about 1.5%, or from about 0.13% to about 1.5%, or from about 0.14% to about 1.5%, or from about 0.15% to about 1.5%, or from about 0.16% to about 1.5%, or from about 0.17% to about 1.5%, or from about 0.18% to about 1.5%, or from about 0.19% to about 1.5%, or from about 0.20% to about 1.5%, or from about 0.21% to about 1.5%, or from about 0.22% to about 1.5%, or from about 0.23% to about 1.5%, or from about 0.24% to about 1.5%, or from about 0.25% to about 1.5%, or from about 0.26% to about 1.5%, or from about 0.27% to about 1.5%, or from about 0.28% to about 1.5%, or from about 0.29% to about 1.5%, or from about 0.30% to about 1.5%, or from about 0.31% to about 1.5%, or from about 0.32% to about 1.5%, or from about 0.33% to about 1.5%, or from about 0.34% to about 1.5%, or from about 0.35% to about 1.5%, or from about 0.36% to about 1.5%, or from about 0.37% to about 1.5%, or from about 0.38% to about 1.5%, or from about 0.39% to about 1.5%, or from about 0.40% to about 1.5%, or from about 0.41% to about 1.5%, or from about 0.42% to about 1.5%, or from about 0.43% to about 1.5%, or from about 0.44% to about 1.5%, or from about 0.45% to about 1.5%, or from about 0.46% to about 1.5%, or from about 0.50% to about 1.5%, or from about 0.55% to about 1.5%, or from about 0.60% to about 1.5%, or from about 0.65% to about 3%, or from about 0.70% to about 3%, or from about 0.75% to about 3%, or from about 0.80% to about 1.5%, or from about 0.85% to about 1.5%, or from about 0.90% to about 1.5%, or from about 0.95% to about 1.5%, or from about 1.0% to about 1.5%, or from about 1.05% to about 1.5%, or from about 1.10% to about 1.5%, or from about 1.15% to about 1.5%, or from about 1.20% to about 1.5%, or from about 1.25% to about 1.5%, from about 0.01% to about 1.25% w/w, or from about 0.02% to about 1.25%, or from about 0.03% to about 1.25%, or from about 0.04% to about 1.25%, or from about 0.05% to about 1.25% w/w, or from about 0.06% to about 1.25%, or from about 0.07% to about 1.25%, or from about 0.08% to about 1.25%, or from about 0.09% to about 1.25%, or from about 0.10% to about 1.25%, or from about 0.11% to about 1.25%, or from about 0.12% to about 1.25%, or from about 0.13% to about 1.25%, or from about 0.14% to about 1.25%, or from about 0.15% to about 1.25%, or from about 0.16% to about 1.25%, or from about 0.17% to about 1.25%, or from about 0.18% to about 1.25%, or from about 0.19% to about 1.25%, or from about 0.20% to about 1.25%, or from about 0.21% to about 1.25%, or from about 0.22% to about 1.25%, or from about 0.23% to about 1.25%, or from about 0.24% to about 1.25%, or from about 0.25% to about 1.25%, or from about 0.26% to about 1.25%, or from about 0.27% to about 1.25%, or from about 0.28% to about 1.25%, or from about 0.29% to about 1.25%, or from about 0.30% to about 1.25%, or from about 0.31% to about 1.25%, or from about 0.32% to about 1.25%, or from about 0.33% to about 1.25%, or from about 0.34% to about 1.25%, or from about 0.35% to about 1.25%, or from about 0.36% to about 1.25%, or from about 0.37% to about 1.25%, or from about 0.38% to about 1.25%, or from about 0.39% to about 1.25%, or from about 0.40% to about 1.25%, or from about 0.41% to about 1.25%, or from about 0.42% to about 1.25%, or from about 0.43% to about 1.25%, or from about 0.44% to about 1.25%, or from about 0.45% to about 1.25%, or from about 0.46% to about 1.25%, or from about 0.50% to about 1.25%, or from about 0.55% to about 1.25%, or from about 0.60% to about 1.25%, or from about 0.65% to about 1.25%, or from about 0.70% to about 1.25%, or from about 0.75% to about 1.25%, or from about 0.80% to about 1.25%, or from about 0.85% to about 1.25%, or from about 0.90% to about 1.25%, or from about 0.95% to about 1.25%, or from about 1.0% to about 1.25%, or from about 1.05% to about 1.25%, or from about 1.10% to about 1.25%, or from about 1.15% to about 1.25%, or from about 1.20% to about 1.25%, from about 0.01% to about 1.20% w/w, or from about 0.02% to about 1.20%, or from about 0.03% to about 1.20%, or from about 0.04% to about 1.20%, or from about 0.05% to about 1.20% w/w, or from about 0.06% to about 1.20%, or from about 0.07% to about 1.20%, or from about 0.08% to about 1.20%, or from about 0.09% to about 1.20%, or from about 0.10% to about 1.20%, or from about 0.11% to about 1.20%, or from about 0.12% to about 1.20%, or from about 0.13% to about 1.20%, or from about 0.14% to about 1.20%, or from about 0.15% to about 1.20%, or from about 0.16% to about 1.20%, or from about 0.17% to about 1.20%, or from about 0.18% to about 1.20%, or from about 0.19% to about 1.20%, or from about 0.20% to about 1.20%, or from about 0.21% to about 1.20%, or from about 0.22% to about 1.20%, or from about 0.23% to about 1.20%, or from about 0.24% to about 1.20%, or from about 0.25% to about 1.20%, or from about 0.26% to about 1.20%, or from about 0.27% to about 1.20%, or from about 0.28% to about 1.20%, or from about 0.29% to about 1.20%, or from about 0.30% to about 1.20%, or from about 0.31% to about 1.20%, or from about 0.32% to about 1.20%, or from about 0.33% to about 1.20%, or from about 0.34% to about 1.20%, or from about 0.35% to about 1.20%, or from about 0.36% to about 1.20%, or from about 0.37% to about 1.20%, or from about 0.38% to about 1.20%, or from about 0.39% to about 1.20%, or from about 0.40% to about 1.20%, or from about 0.41% to about 1.20%, or from about 0.42% to about 1.20%, or from about 0.43% to about 1.20%, or from about 0.44% to about 1.20%, or from about 0.45% to about 1.20%, or from about 0.46% to about 1.20%, or from about 0.50% to about 1.20%, or from about 0.55% to about 1.20%, or from about 0.60% to about 1.20%, or from about 0.65% to about 1.20%, or from about 0.70% to about 1.20%, or from about 0.75% to about 1.20%, or from about 0.80% to about 1.20%, or from about 0.85% to about 1.20%, or from about 0.90% to about 1.20%, or from about 0.95% to about 1.20%, or from about 1.0% to about 1.20%, or from about 1.05% to about 1.20%, or from about 1.10% to about 1.20%, or from about 1.15% to about 1.20%, from about 0.01% to about 1.15% w/w, or from about 0.02% to about 1.15%, or from about 0.03% to about 1.15%, or from about 0.04% to about 1.15%, or from about 0.05% to about 1.15% w/w, or from about 0.06% to about 1.15%, or from about 0.07% to about 1.15%, or from about 0.08% to about 1.15%, or from about 0.09% to about 1.15%, or from about 0.10% to about 1.15%, or from about 0.11% to about 1.15%, or from about 0.12% to about 1.15%, or from about 0.13% to about 1.15%, or from about 0.14% to about 1.15%, or from about 0.15% to about 1.15%, or from about 0.16% to about 1.15%, or from about 0.17% to about 1.15%, or from about 0.18% to about 1.15%, or from about 0.19% to about 1.15%, or from about 0.20% to about 1.15%, or from about 0.21% to about 1.15%, or from about 0.22% to about 1.15%, or from about 0.23% to about 1.15%, or from about 0.24% to about 1.15%, or from about 0.25% to about 1.15%, or from about 0.26% to about 1.15%, or from about 0.27% to about 1.15%, or from about 0.28% to about 1.15%, or from about 0.29% to about 1.15%, or from about 0.30% to about 1.15%, or from about 0.31% to about 1.15%, or from about 0.32% to about 1.15%, or from about 0.33% to about 1.15%, or from about 0.34% to about 1.15%, or from about 0.35% to about 1.15%, or from about 0.36% to about 1.15%, or from about 0.37% to about 1.15%, or from about 0.38% to about 1.15%, or from about 0.39% to about 1.15%, or from about 0.40% to about 1.15%, or from about 0.41% to about 1.15%, or from about 0.42% to about 1.15%, or from about 0.43% to about 1.15%, or from about 0.44% to about 1.15%, or from about 0.45% to about 1.15%, or from about 0.46% to about 1.15%, or from about 0.50% to about 1.15%, or from about 0.55% to about 1.15%, or from about 0.60% to about 1.15%, or from about 0.65% to about 1.15%, or from about 0.70% to about 1.15%, or from about 0.75% to about 1.15%, or from about 0.80% to about 1.15%, or from about 0.85% to about 1.15%, or from about 0.90% to about 1.15%, or from about 0.95% to about 1.15%, or from about 1.0% to about 1.15%, or from about 1.05% to about 1.15%, or from about 1.10% to about 1.15%, from about 0.01% to about 1.10% w/w, or from about 0.02% to about 1.10%, or from about 0.03% to about 1.10%, or from about 0.04% to about 1.10%, or from about 0.05% to about 1.10% w/w, or from about 0.06% to about 1.10%, or from about 0.07% to about 1.10%, or from about 0.08% to about 1.10%, or from about 0.09% to about 1.10%, or from about 0.10% to about 1.10%, or from about 0.11% to about 1.10%, or from about 0.12% to about 1.10%, or from about 0.13% to about 1.10%, or from about 0.14% to about 1.10%, or from about 0.15% to about 1.10%, or from about 0.16% to about 1.10%, or from about 0.17% to about 1.10%, or from about 0.18% to about 1.10%, or from about 0.19% to about 1.10%, or from about 0.20% to about 1.10%, or from about 0.21% to about 1.10%, or from about 0.22% to about 1.10%, or from about 0.23% to about 1.10%, or from about 0.24% to about 1.10%, or from about 0.25% to about 1.10%, or from about 0.26% to about 1.10%, or from about 0.27% to about 1.10%, or from about 0.28% to about 1.10%, or from about 0.29% to about 1.10%, or from about 0.30% to about 1.10%, or from about 0.31% to about 1.10%, or from about 0.32% to about 1.10%, or from about 0.33% to about 1.10%, or from about 0.34% to about 1.10%, or from about 0.35% to about 1.10%, or from about 0.36% to about 1.10%, or from about 0.37% to about 1.10%, or from about 0.38% to about 1.10%, or from about 0.39% to about 1.10%, or from about 0.40% to about 1.10%, or from about 0.41% to about 1.10%, or from about 0.42% to about 1.10%, or from about 0.43% to about 1.10%, or from about 0.44% to about 1.10%, or from about 0.45% to about 1.10%, or from about 0.46% to about 1.10%, or from about 0.50% to about 1.10%, or from about 0.55% to about 1.10%, or from about 0.60% to about 1.10%, or from about 0.65% to about 1.10%, or from about 0.70% to about 1.10%, or from about 0.75% to about 1.10%, or from about 0.80% to about 1.10%, or from about 0.85% to about 1.10%, or from about 0.90% to about 1.10%, or from about 0.95% to about 1.10%, or from about 1.0% to about 1.10%, or from about 1.05% to about 1.10%, from about 0.01% to about 1.05% w/w, or from about 0.02% to about 1.05%, or from about 0.03% to about 1.05%, or from about 0.04% to about 1.05%, or from about 0.05% to about 1.05% w/w, or from about 0.06% to about 1.05%, or from about 0.07% to about 1.05%, or from about 0.08% to about 1.05%, or from about 0.09% to about 1.05%, or from about 0.10% to about 1.05%, or from about 0.11% to about 1.05%, or from about 0.12% to about 1.05%, or from about 0.13% to about 1.05%, or from about 0.14% to about 1.05%, or from about 0.15% to about 1.05%, or from about 0.16% to about 1.05%, or from about 0.17% to about 1.05%, or from about 0.18% to about 1.05%, or from about 0.19% to about 1.05%, or from about 0.20% to about 1.05%, or from about 0.21% to about 1.05%, or from about 0.22% to about 1.05%, or from about 0.23% to about 1.05%, or from about 0.24% to about 1.05%, or from about 0.25% to about 1.05%, or from about 0.26% to about 1.05%, or from about 0.27% to about 1.05%, or from about 0.28% to about 1.05%, or from about 0.29% to about 1.05%, or from about 0.30% to about 1.05%, or from about 0.31% to about 1.05%, or from about 0.32% to about 1.05%, or from about 0.33% to about 1.05%, or from about 0.34% to about 1.05%, or from about 0.35% to about 1.05%, or from about 0.36% to about 1.05%, or from about 0.37% to about 1.05%, or from about 0.38% to about 1.05%, or from about 0.39% to about 1.05%, or from about 0.40% to about 1.05%, or from about 0.41% to about 1.05%, or from about 0.42% to about 1.05%, or from about 0.43% to about 1.05%, or from about 0.44% to about 1.05%, or from about 0.45% to about 1.05%, or from about 0.46% to about 1.05%, or from about 0.50% to about 1.05%, or from about 0.55% to about 1.05%, or from about 0.60% to about 1.05%, or from about 0.65% to about 1.05%, or from about 0.70% to about 1.05%, or from about 0.75% to about 1.05%, or from about 0.80% to about 1.05%, or from about 0.85% to about 1.05%, or from about 0.90% to about 1.05%, or from about 0.95% to about 1.05%, or from about 1.0% to about 1.05%, from about 0.01% to about 1.0% w/w, or from about 0.02% to about 1.0%, or from about 0.03% to about 1.0%, or from about 0.04% to about 1.0%, or from about 0.05% to about 1.0% w/w, or from about 0.06% to about 1.0%, or from about 0.07% to about 1.0%, or from about 0.08% to about 1.0%, or from about 0.09% to about 1.0%, or from about 0.10% to about 1.0%, or from about 0.11% to about 1.0%, or from about 0.12% to about 1.0%, or from about 0.13% to about 1.0%, or from about 0.14% to about 1.0%, or from about 0.15% to about 1.0%, or from about 0.16% to about 1.0%, or from about 0.17% to about 1.0%, or from about 0.18% to about 1.0%, or from about 0.19% to about 1.0%, or from about 0.20% to about 1.0%, or from about 0.21% to about 1.0%, or from about 0.22% to about 1.0%, or from about 0.23% to about 1.0%, or from about 0.24% to about 1.0%, or from about 0.25% to about 1.0%, or from about 0.26% to about 1.0%, or from about 0.27% to about 1.0%, or from about 0.28% to about 1.0%, or from about 0.29% to about 1.0%, or from about 0.30% to about 1.0%, or from about 0.31% to about 1.0%, or from about 0.32% to about 1.0%, or from about 0.33% to about 1.0%, or from about 0.34% to about 1.0%, or from about 0.35% to about 1.0%, or from about 0.36% to about 1.0%, or from about 0.37% to about 1.0%, or from about 0.38% to about 1.0%, or from about 0.39% to about 1.0%, or from about 0.40% to about 1.0%, or from about 0.41% to about 1.0%, or from about 0.42% to about 1.0%, or from about 0.43% to about 1.0%, or from about 0.44% to about 1.0%, or from about 0.45% to about 1.0%, or from about 0.46% to about 1.0%, or from about 0.50% to about 1.0%, or from about 0.55% to about 1.0%, or from about 0.60% to about 1.0%, or from about 0.65% to about 1.0%, or from about 0.70% to about 1.0%, or from about 0.75% to about 1.0%, or from about 0.80% to about 1.0%, or from about 0.85% to about 1.0%, or from about 0.90% to about 1.0%, or from about 0.95% to about 1.0%, from about 0.01% to about 0.95% w/w, or from about 0.02% to about 0.95%, or from about 0.03% to about 0.95%, or from about 0.04% to about 0.95%, or from about 0.05% to about 0.95% w/w, or from about 0.06% to about 0.95%, or from about 0.07% to about 0.95%, or from about 0.08% to about 0.95%, or from about 0.09% to about 0.95%, or from about 0.10% to about 0.95%, or from about 0.11% to about 0.95%, or from about 0.12% to about 0.95%, or from about 0.13% to about 0.95%, or from about 0.14% to about 0.95%, or from about 0.15% to about 0.95%, or from about 0.16% to about 0.95%, or from about 0.17% to about 0.95%, or from about 0.18% to about 0.95%, or from about 0.19% to about 0.95%, or from about 0.20% to about 0.95%, or from about 0.21% to about 0.95%, or from about 0.22% to about 0.95%, or from about 0.23% to about 0.95%, or from about 0.24% to about 0.95%, or from about 0.25% to about 0.95%, or from about 0.26% to about 0.95%, or from about 0.27% to about 0.95%, or from about 0.28% to about 0.95%, or from about 0.29% to about 0.95%, or from about 0.30% to about 0.95%, or from about 0.31% to about 0.95%, or from about 0.32% to about 0.95%, or from about 0.33% to about 0.95%, or from about 0.34% to about 0.95%, or from about 0.35% to about 0.95%, or from about 0.36% to about 0.95%, or from about 0.37% to about 0.95%, or from about 0.38% to about 0.95%, or from about 0.39% to about 0.95%, or from about 0.40% to about 0.95%, or from about 0.41% to about 0.95%, or from about 0.42% to about 0.95%, or from about 0.43% to about 0.95%, or from about 0.44% to about 0.95%, or from about 0.45% to about 0.95%, or from about 0.46% to about 0.95%, or from about 0.50% to about 0.95%, or from about 0.55% to about 0.95%, or from about 0.60% to about 0.95%, or from about 0.65% to about 0.95%, or from about 0.70% to about 0.95%, or from about 0.75% to about 0.95%, or from about 0.80% to about 0.95%, or from about 0.85% to about 0.95%, or from about 0.90% to about 0.95%, from about 0.01% to about 0.90% w/w, or from about 0.02% to about 0.90%, or from about 0.03% to about 0.90%, or from about 0.04% to about 0.90%, or from about 0.05% to about 0.90% w/w, or from about 0.06% to about 0.90%, or from about 0.07% to about 0.90%, or from about 0.08% to about 0.90%, or from about 0.09% to about 0.90%, or from about 0.10% to about 0.90%, or from about 0.11% to about 0.90%, or from about 0.12% to about 0.90%, or from about 0.13% to about 0.90%, or from about 0.14% to about 0.90%, or from about 0.15% to about 0.90%, or from about 0.16% to about 0.90%, or from about 0.17% to about 0.90%, or from about 0.18% to about 0.90%, or from about 0.19% to about 0.90%, or from about 0.20% to about 0.90%, or from about 0.21% to about 0.90%, or from about 0.22% to about 0.90%, or from about 0.23% to about 0.90%, or from about 0.24% to about 0.90%, or from about 0.25% to about 0.90%, or from about 0.26% to about 0.90%, or from about 0.27% to about 0.90%, or from about 0.28% to about 0.90%, or from about 0.29% to about 0.90%, or from about 0.30% to about 0.90%, or from about 0.31% to about 0.90%, or from about 0.32% to about 0.90%, or from about 0.33% to about 0.90%, or from about 0.34% to about 0.90%, or from about 0.35% to about 0.90%, or from about 0.36% to about 0.90%, or from about 0.37% to about 0.90%, or from about 0.38% to about 0.90%, or from about 0.39% to about 0.90%, or from about 0.40% to about 0.90%, or from about 0.41% to about 0.90%, or from about 0.42% to about 0.90%, or from about 0.43% to about 0.90%, or from about 0.44% to about 0.90%, or from about 0.45% to about 0.90%, or from about 0.46% to about 0.90%, or from about 0.50% to about 0.90%, or from about 0.55% to about 0.90%, or from about 0.60% to about 0.90%, or from about 0.65% to about 0.90%, or from about 0.70% to about 0.90%, or from about 0.75% to about 0.90%, or from about 0.80% to about 0.90%, or from about 0.85% to about 0.90%, from about 0.01% to about 0.85% w/w, or from about 0.02% to about 0.85%, or from about 0.03% to about 0.85%, or from about 0.04% to about 0.85%, or from about 0.05% to about 0.85% w/w, or from about 0.06% to about 0.85%, or from about 0.07% to about 0.85%, or from about 0.08% to about 0.85%, or from about 0.09% to about 0.85%, or from about 0.10% to about 0.85%, or from about 0.11% to about 0.85%, or from about 0.12% to about 0.85%, or from about 0.13% to about 0.85%, or from about 0.14% to about 0.85%, or from about 0.15% to about 0.85%, or from about 0.16% to about 0.85%, or from about 0.17% to about 0.85%, or from about 0.18% to about 0.85%, or from about 0.19% to about 0.85%, or from about 0.20% to about 0.85%, or from about 0.21% to about 0.85%, or from about 0.22% to about 0.85%, or from about 0.23% to about 0.85%, or from about 0.24% to about 0.85%, or from about 0.25% to about 0.85%, or from about 0.26% to about 0.85%, or from about 0.27% to about 0.85%, or from about 0.28% to about 0.85%, or from about 0.29% to about 0.85%, or from about 0.30% to about 0.85%, or from about 0.31% to about 0.85%, or from about 0.32% to about 0.85%, or from about 0.33% to about 0.85%, or from about 0.34% to about 0.85%, or from about 0.35% to about 0.85%, or from about 0.36% to about 0.85%, or from about 0.37% to about 0.85%, or from about 0.38% to about 0.85%, or from about 0.39% to about 0.85%, or from about 0.40% to about 0.85%, or from about 0.41% to about 0.85%, or from about 0.42% to about 0.85%, or from about 0.43% to about 0.85%, or from about 0.44% to about 0.85%, or from about 0.45% to about 0.85%, or from about 0.46% to about 0.85%, or from about 0.50% to about 0.85%, or from about 0.55% to about 0.85%, or from about 0.60% to about 0.85%, or from about 0.65% to about 0.85%, or from about 0.70% to about 0.85%, or from about 0.75% to about 0.85%, or from about 0.80% to about 0.85%, from about 0.01 to about 0.80% w/w, or from about 0.02% to about 0.80%, or from about 0.03% to about 0.80%, or from about 0.04% to about 0.80%, or from about 0.05% to about 0.80% w/w, or from about 0.06% to about 0.80%, or from about 0.07% to about 0.80%, or from about 0.08% to about 0.80%, or from about 0.09% to about 0.80%, or from about 0.10% to about 0.80%, or from about 0.11% to about 0.80%, or from about 0.12% to about 0.80%, or from about 0.13% to about 0.80%, or from about 0.14% to about 0.80%, or from about 0.15% to about 0.80%, or from about 0.16% to about 0.80%, or from about 0.17% to about 0.80%, or from about 0.18% to about 0.80%, or from about 0.19% to about 0.80%, or from about 0.20% to about 0.80%, or from about 0.21% to about 0.80%, or from about 0.22% to about 0.80%, or from about 0.23% to about 0.80%, or from about 0.24% to about 0.80%, or from about 0.25% to about 0.80%, or from about 0.26% to about 0.80%, or from about 0.27% to about 0.80%, or from about 0.28% to about 0.80%, or from about 0.29% to about 0.80%, or from about 0.30% to about 0.80%, or from about 0.31% to about 0.80%, or from about 0.32% to about 0.80%, or from about 0.33% to about 0.80%, or from about 0.34% to about 0.80%, or from about 0.35% to about 0.80%, or from about 0.36% to about 0.80%, or from about 0.37% to about 0.80%, or from about 0.38% to about 0.80%, or from about 0.39% to about 0.80%, or from about 0.40% to about 0.80%, or from about 0.41% to about 0.80%, or from about 0.42% to about 0.80%, or from about 0.43% to about 0.80%, or from about 0.44% to about 0.80%, or from about 0.45% to about 0.80%, or from about 0.46% to about 0.80%, or from about 0.50% to about 0.80%, or from about 0.55% to about 0.80%, or from about 0.60% to about 0.80%, or from about 0.65% to about 0.80%, or from about 0.70% to about 0.80%, or from about 0.75% to about 0.80%, from about 0.01% to about 0.75% w/w, or from about 0.02% to about 0.75%, or from about 0.03% to about 0.75%, or from about 0.04% to about 0.75%, or from about 0.05% to about 0.75% w/w, or from about 0.06% to about 0.75%, or from about 0.07% to about 0.75%, or from about 0.08% to about 0.75%, or from about 0.09% to about 0.75%, or from about 0.10% to about 0.75%, or from about 0.11% to about 0.75%, or from about 0.12% to about 0.75%, or from about 0.13% to about 0.75%, or from about 0.14% to about 0.75%, or from about 0.15% to about 0.75%, or from about 0.16% to about 0.75%, or from about 0.17% to about 0.75%, or from about 0.18% to about 0.75%, or from about 0.19% to about 0.75%, or from about 0.20% to about 0.75%, or from about 0.21% to about 0.75%, or from about 0.22% to about 0.75%, or from about 0.23% to about 0.75%, or from about 0.24% to about 0.75%, or from about 0.25% to about 0.75%, or from about 0.26% to about 0.75%, or from about 0.27% to about 0.75%, or from about 0.28% to about 0.75%, or from about 0.29% to about 0.75%, or from about 0.30% to about 0.75%, or from about 0.31% to about 0.75%, or from about 0.32% to about 0.75%, or from about 0.33% to about 0.75%, or from about 0.34% to about 0.75%, or from about 0.35% to about 0.75%, or from about 0.36% to about 0.75%, or from about 0.37% to about 0.75%, or from about 0.38% to about 0.75%, or from about 0.39% to about 0.75%, or from about 0.40% to about 0.75%, or from about 0.41% to about 0.75%, or from about 0.42% to about 0.75%, or from about 0.43% to about 0.75%, or from about 0.44% to about 0.75%, or from about 0.45% to about 0.75%, or from about 0.46% to about 0.75%, or from about 0.50% to about 0.75%, or from about 0.55% to about 0.75%, or from about 0.60% to about 0.75%, or from about 0.65% to about 0.75%, or from about 0.70% to about 0.75%, from about 0.01 to about 0.70% w/w, or from about 0.02% to about 0.70%, or from about 0.03% to about 0.70%, or from about 0.04% to about 0.70%, or from about 0.05% to about 0.70% w/w, or from about 0.06% to about 0.70%, or from about 0.07% to about 0.70%, or from about 0.08% to about 0.70%, or from about 0.09% to about 0.70%, or from about 0.10% to about 0.70%, or from about 0.11% to about 0.70%, or from about 0.12% to about 0.70%, or from about 0.13% to about 0.70%, or from about 0.14% to about 0.70%, or from about 0.15% to about 0.70%, or from about 0.16% to about 0.70%, or from about 0.17% to about 0.70%, or from about 0.18% to about 0.70%, or from about 0.19% to about 0.70%, or from about 0.20% to about 0.70%, or from about 0.21% to about 0.70%, or from about 0.22% to about 0.70%, or from about 0.23% to about 0.70%, or from about 0.24% to about 0.70%, or from about 0.25% to about 0.70%, or from about 0.26% to about 0.70%, or from about 0.27% to about 0.70%, or from about 0.28% to about 0.70%, or from about 0.29% to about 0.70%, or from about 0.30% to about 0.70%, or from about 0.31% to about 0.70%, or from about 0.32% to about 0.70%, or from about 0.33% to about 0.70%, or from about 0.34% to about 0.70%, or from about 0.35% to about 0.70%, or from about 0.36% to about 0.70%, or from about 0.37% to about 0.70%, or from about 0.38% to about 0.70%, or from about 0.39% to about 0.70%, or from about 0.40% to about 0.70%, or from about 0.41% to about 0.70%, or from about 0.42% to about 0.70%, or from about 0.43% to about 0.70%, or from about 0.44% to about 0.70%, or from about 0.45% to about 0.70%, or from about 0.46% to about 0.70%, or from about 0.50% to about 0.70%, or from about 0.55% to about 0.70%, or from about 0.60% to about 0.70%, or from about 0.65% to about 0.70%, from about 0.01% to about 0.65% w/w, or from about 0.02% to about 0.65%, or from about 0.03% to about 0.65%, or from about 0.04% to about 0.65%, or from about 0.05% to about 0.65% w/w, or from about 0.06% to about 0.65%, or from about 0.07% to about 0.65%, or from about 0.08% to about 0.65%, or from about 0.09% to about 0.65%, or from about 0.10% to about 0.65%, or from about 0.11% to about 0.65%, or from about 0.12% to about 0.65%, or from about 0.13% to about 0.65%, or from about 0.14% to about 0.65%, or from about 0.15% to about 0.65%, or from about 0.16% to about 0.65%, or from about 0.17% to about 0.65%, or from about 0.18% to about 0.65%, or from about 0.19% to about 0.65%, or from about 0.20% to about 0.65%, or from about 0.21% to about 0.65%, or from about 0.22% to about 0.65%, or from about 0.23% to about 0.65%, or from about 0.24% to about 0.65%, or from about 0.25% to about 0.65%, or from about 0.26% to about 0.65%, or from about 0.27% to about 0.65%, or from about 0.28% to about 0.65%, or from about 0.29% to about 0.65%, or from about 0.30% to about 0.65%, or from about 0.31% to about 0.65%, or from about 0.32% to about 0.65%, or from about 0.33% to about 0.65%, or from about 0.34% to about 0.65%, or from about 0.35% to about 0.65%, or from about 0.36% to about 0.65%, or from about 0.37% to about 0.65%, or from about 0.38% to about 0.65%, or from about 0.39% to about 0.65%, or from about 0.40% to about 0.65%, or from about 0.41% to about 0.65%, or from about 0.42% to about 0.65%, or from about 0.43% to about 0.65%, or from about 0.44% to about 0.65%, or from about 0.45% to about 0.65%, or from about 0.46% to about 0.65%, or from about 0.50% to about 0.65%, or from about 0.55% to about 0.65%, or from about 0.60% to about 0.65%, from about 0.01 to about 0.60% w/w, or from about 0.02% to about 0.60%, or from about 0.03% to about 0.60%, or from about 0.04% to about 0.60%, or from about 0.05% to about 0.60% w/w, or from about 0.06% to about 0.60%, or from about 0.07% to about 0.60%, or from about 0.08% to about 0.60%, or from about 0.09% to about 0.60%, or from about 0.10% to about 0.60%, or from about 0.11% to about 0.60%, or from about 0.12% to about 0.60%, or from about 0.13% to about 0.60%, or from about 0.14% to about 0.60%, or from about 0.15% to about 0.60%, or from about 0.16% to about 0.60%, or from about 0.17% to about 0.60%, or from about 0.18% to about 0.60%, or from about 0.19% to about 0.60%, or from about 0.20% to about 0.60%, or from about 0.21% to about 0.60%, or from about 0.22% to about 0.60%, or from about 0.23% to about 0.60%, or from about 0.24% to about 0.60%, or from about 0.25% to about 0.60%, or from about 0.26% to about 0.60%, or from about 0.27% to about 0.60%, or from about 0.28% to about 0.60%, or from about 0.29% to about 0.60%, or from about 0.30% to about 0.60%, or from about 0.31% to about 0.60%, or from about 0.32% to about 0.60%, or from about 0.33% to about 0.60%, or from about 0.34% to about 0.60%, or from about 0.35% to about 0.60%, or from about 0.36% to about 0.60%, or from about 0.37% to about 0.60%, or from about 0.38% to about 0.60%, or from about 0.39% to about 0.60%, or from about 0.40% to about 0.60%, or from about 0.41% to about 0.60%, or from about 0.42% to about 0.60%, or from about 0.43% to about 0.60%, or from about 0.44% to about 0.60%, or from about 0.45% to about 0.60%, or from about 0.46% to about 0.60%, or from about 0.50% to about 0.60%, or from about 0.55% to about 0.60%, from about 0.01% to about 0.55% w/w, or from about 0.02% to about 0.55%, or from about 0.03% to about 0.55%, or from about 0.04% to about 0.55%, or from about 0.05% to about 0.55% w/w, or from about 0.06% to about 0.55%, or from about 0.07% to about 0.55%, or from about 0.08% to about 0.55%, or from about 0.09% to about 0.55%, or from about 0.10% to about 0.55%, or from about 0.11% to about 0.55%, or from about 0.12% to about 0.55%, or from about 0.13% to about 0.55%, or from about 0.14% to about 0.55%, or from about 0.15% to about 0.55%, or from about 0.16% to about 0.55%, or from about 0.17% to about 0.55%, or from about 0.18% to about 0.55%, or from about 0.19% to about 0.55%, or from about 0.20% to about 0.55%, or from about 0.21% to about 0.55%, or from about 0.22% to about 0.55%, or from about 0.23% to about 0.55%, or from about 0.24% to about 0.55%, or from about 0.25% to about 0.55%, or from about 0.26% to about 0.55%, or from about 0.27% to about 0.55%, or from about 0.28% to about 0.55%, or from about 0.29% to about 0.55%, or from about 0.30% to about 0.55%, or from about 0.31% to about 0.55%, or from about 0.32% to about 0.55%, or from about 0.33% to about 0.55%, or from about 0.34% to about 0.55%, or from about 0.35% to about 0.55%, or from about 0.36% to about 0.55%, or from about 0.37% to about 0.55%, or from about 0.38% to about 0.55%, or from about 0.39% to about 0.55%, or from about 0.40% to about 0.55%, or from about 0.41% to about 0.55%, or from about 0.42% to about 0.55%, or from about 0.43% to about 0.55%, or from about 0.44% to about 0.55%, or from about 0.45% to about 0.55%, or from about 0.46% to about 0.55%, or from about 0.50% to about 0.55%, from about 0.01 to about 0.50% w/w, or from about 0.02% to about 0.50%, or from about 0.03% to about 0.50%, or from about 0.04% to about 0.50%, or from about 0.05% to about 0.50% w/w, or from about 0.06% to about 0.50%, or from about 0.07% to about 0.50%, or from about 0.08% to about 0.50%, or from about 0.09% to about 0.50%, or from about 0.10% to about 0.50%, or from about 0.11% to about 0.50%, or from about 0.12% to about 0.50%, or from about 0.13% to about 0.50%, or from about 0.14% to about 0.50%, or from about 0.15% to about 0.50%, or from about 0.16% to about 0.50%, or from about 0.17% to about 0.50%, or from about 0.18% to about 0.50%, or from about 0.19% to about 0.50%, or from about 0.20% to about 0.50%, or from about 0.21% to about 0.50%, or from about 0.22% to about 0.50%, or from about 0.23% to about 0.50%, or from about 0.24% to about 0.50%, or from about 0.25% to about 0.50%, or from about 0.26% to about 0.50%, or from about 0.27% to about 0.50%, or from about 0.28% to about 0.50%, or from about 0.29% to about 0.50%, or from about 0.30% to about 0.50%, or from about 0.31% to about 0.50%, or from about 0.32% to about 0.50%, or from about 0.33% to about 0.50%, or from about 0.34% to about 0.50%, or from about 0.35% to about 0.50%, or from about 0.36% to about 0.50%, or from about 0.37% to about 0.50%, or from about 0.38% to about 0.50%, or from about 0.39% to about 0.50%, or from about 0.40% to about 0.50%, or from about 0.41% to about 0.50%, or from about 0.42% to about 0.50%, or from about 0.43% to about 0.50%, or from about 0.44% to about 0.50%, or from about 0.45% to about 0.50%, or from about 0.46% to about 0.50%, from about 0.01% to about 0.45% w/w, or from about 0.02% to about 0.45%, or from about 0.03% to about 0.45%, or from about 0.04% to about 0.45%, or from about 0.05% to about 0.45% w/w, or from about 0.06% to about 0.45%, or from about 0.07% to about 0.45%, or from about 0.08% to about 0.45%, or from about 0.09% to about 0.45%, or from about 0.10% to about 0.45%, or from about 0.11% to about 0.45%, or from about 0.12% to about 0.45%, or from about 0.13% to about 0.45%, or from about 0.14% to about 0.45%, or from about 0.15% to about 0.45%, or from about 0.16% to about 0.45%, or from about 0.17% to about 0.45%, or from about 0.18% to about 0.45%, or from about 0.19% to about 0.45%, or from about 0.20% to about 0.45%, or from about 0.21% to about 0.45%, or from about 0.22% to about 0.45%, or from about 0.23% to about 0.45%, or from about 0.24% to about 0.45%, or from about 0.25% to about 0.45%, or from about 0.26% to about 0.45%, or from about 0.27% to about 0.45%, or from about 0.28% to about 0.45%, or from about 0.29% to about 0.45%, or from about 0.30% to about 0.45%, or from about 0.31% to about 0.45%, or from about 0.32% to about 0.45%, or from about 0.33% to about 0.45%, or from about 0.34% to about 0.45%, or from about 0.35% to about 0.45%, or from about 0.36% to about 0.45%, or from about 0.37% to about 0.45%, or from about 0.38% to about 0.45%, or from about 0.39% to about 0.45%, or from about 0.40% to about 0.45%, or from about 0.41% to about 0.45%, or from about 0.42% to about 0.45%, or from about 0.43% to about 0.45%, or from about 0.44% to about 0.45%, from about 0.01% to about 0.40% w/w, or from about 0.02% to about 0.40%, or from about 0.03% to about 0.40%, or from about 0.04% to about 0.40%, or from about 0.05% to about 0.40% w/w, or from about 0.06% to about 0.40%, or from about 0.07% to about 0.40%, or from about 0.08% to about 0.40%, or from about 0.09% to about 0.40%, or from about 0.10% to about 0.40%, or from about 0.11% to about 0.40%, or from about 0.12% to about 0.40%, or from about 0.13% to about 0.40%, or from about 0.14% to about 0.40%, or from about 0.15% to about 0.40%, or from about 0.16% to about 0.40%, or from about 0.17% to about 0.40%, or from about 0.18% to about 0.40%, or from about 0.19% to about 0.40%, or from about 0.20% to about 0.40%, or from about 0.21% to about 0.40%, or from about 0.22% to about 0.40%, or from about 0.23% to about 0.40%, or from about 0.24% to about 0.40%, or from about 0.25% to about 0.40%, or from about 0.26% to about 0.40%, or from about 0.27% to about 0.40%, or from about 0.28% to about 0.40%, or from about 0.29% to about 0.40%, or from about 0.30% to about 0.40%, or from about 0.31% to about 0.40%, or from about 0.32% to about 0.40%, or from about 0.33% to about 0.40%, or from about 0.34% to about 0.40%, or from about 0.35% to about 0.40%, from about 0.01 to about 0.35% w/w, or from about 0.02% to about 0.35%, or from about 0.03% to about 0.35%, or from about 0.04% to about 0.35%, or from about 0.05% to about 0.35% w/w, or from about 0.06% to about 0.35%, or from about 0.07% to about 0.35%, or from about 0.08% to about 0.35%, or from about 0.09% to about 0.35%, or from about 0.10% to about 0.35%, or from about 0.11% to about 0.35%, or from about 0.12% to about 0.35%, or from about 0.13% to about 0.35%, or from about 0.14% to about 0.35%, or from about 0.15% to about 0.35%, or from about 0.16% to about 0.35%, or from about 0.17% to about 0.35%, or from about 0.18% to about 0.35%, or from about 0.19% to about 0.35%, or from about 0.20% to about 0.35%, or from about 0.21% to about 0.35%, or from about 0.22% to about 0.35%, or from about 0.23% to about 0.35%, or from about 0.24% to about 0.35%, or from about 0.25% to about 0.35%, or from about 0.26% to about 0.35%, or from about 0.27% to about 0.35%, or from about 0.28% to about 0.35%, or from about 0.29% to about 0.35%, or from about 0.30% to about 0.35%, from about 0.01% to about 0.30% w/w, or from about 0.02% to about 0.30%, or from about 0.03% to about 0.30%, or from about 0.04% to about 0.30%, or from about 0.05% to about 0.30% w/w, or from about 0.06% to about 0.30%, or from about 0.07% to about 0.30%, or from about 0.08% to about 0.30%, or from about 0.09% to about 0.30%, or from about 0.10% to about 0.30%, or from about 0.11% to about 0.30%, or from about 0.12% to about 0.30%, or from about 0.13% to about 0.30%, or from about 0.14% to about 0.30%, or from about 0.15% to about 0.30%, or from about 0.16% to about 0.30%, or from about 0.17% to about 0.30%, or from about 0.18% to about 0.30%, or from about 0.19% to about 0.30%, or from about 0.20% to about 0.30%, or from about 0.21% to about 0.30%, or from about 0.22% to about 0.30%, or from about 0.23% to about 0.30%, or from about 0.24% to about 0.30%, or from about 0.25% to about 0.30%, from about 0.01 to about 0.25% w/w, or from about 0.02% to about 0.25%, or from about 0.03% to about 0.25%, or from about 0.04% to about 0.25%, or from about 0.05% to about 0.25% w/w, or from about 0.06% to about 0.25%, or from about 0.07% to about 0.25%, or from about 0.08% to about 0.25%, or from about 0.09% to about 0.25%, or from about 0.10% to about 0.25%, or from about 0.11% to about 0.25%, or from about 0.12% to about 0.25%, or from about 0.13% to about 0.25%, or from about 0.14% to about 0.25%, or from about 0.15% to about 0.25%, or from about 0.16% to about 0.25%, or from about 0.17% to about 0.25%, or from about 0.18% to about 0.25%, or from about 0.19% to about 0.25%, or from about 0.20% to about 0.25%, from about 0.05% to about 0.25% w/w, or from about 0.06% to about 0.25%, or from about 0.07% to about 0.25%, or from about 0.08% to about 0.25%, or from about 0.09% to about 0.25%, or from about 0.10% to about 0.25%, or from about 0.11% to about 0.25%, or from about 0.12% to about 0.25%, or from about 0.13% to about 0.25%, or from about 0.14% to about 0.25%, or from about 0.15% to about 0.25%, or from about 0.16% to about 0.25%, or from about 0.17% to about 0.25%, or from about 0.18% to about 0.25%, or from about 0.19% to about 0.25%, or from about 0.20% to about 0.25%, from about 0.01% to about 0.2% w/w, or from about 0.02% to about 0.2%, or from about 0.03% to about 0.2%, or from about 0.04% to about 0.2%, or from about 0.05% to about 0.2% w/w, or from about 0.06% to about 0.2%, or from about 0.07% to about 0.2%, or from about 0.08% to about 0.2%, or from about 0.09% to about 0.2%, or from about 0.10% to about 0.2%, or from about 0.11% to about 0.2%, or from about 0.12% to about 0.2%, or from about 0.13% to about 0.2%, or from about 0.14% to about 0.2%, or from about 0.15% to about 0.2%, from about 0.01% to about 0.15% w/w, or from about 0.02% to about 0.15%, or from about 0.03% to about 0.15%, or from about 0.04% to about 0.15%, or from about 0.05% to about 0.15% w/w, or from about 0.06% to about 0.15%, or from about 0.07% to about 0.15%, or from about 0.08% to about 0.15%, or from about 0.09% to about 0.15%, or from about 0.10% to about 0.15%, from about 0.01% to about 0.10% w/w, or from about 0.02% to about 0.10%, or from about 0.03% to about 0.10%, or from about 0.04% to about 0.10%, or from about 0.05% to about 0.10% w/w of the phenolic compound, In a particular embodiment, the pesticide compositions of the present invention comprise 0.18% (w/w) thymol or carvacrol. In another embodiment, the pesticide compositions of the present invention comprise 0.23% (w/w) thymol or carvacrol. In another embodiment, the pesticide compositions of the present invention comprise 0.12% (w/w) thymol or carvacrol. In another embodiment, the pesticide compositions of the present invention comprise 0.46% (w/w) thymol or carvacrol. In another embodiment, the pesticide compositions of the present invention comprise 1.15% (w/w) thymol or carvacrol.

Phenolic compounds typically have an associated pungent odor severely impeding large-scale applications. In an embodiment, the pesticide compositions of the present invention may thus further comprise one or more agents having the dual function of further enhancing the disinfectant properties of the compositions while imparting a more pleasant odor thereto. In yet a further embodiment of the present invention, the pesticide compositions of the present invention may further comprise one or more agents imparting a pleasant odor thereto (fragrance agent). Non-limiting examples of agents imparting a pleasant odor and/or enhancing the disinfectant properties comprise carvacrol, cymene, cineol, eugenol, thymol, menthol, citral and limonene. Further suitable examples of such agents are within the capacity of a skilled technician.

The pesticide compositions of the present invention may optionally include a wide range of additional ingredients, which may be added to the supplement present in some embodiments of the present invention. Non-limiting examples of which include colorants, pH adjusting agents, and sequestering agents. Such additional ingredients are within the capacity of a skilled technician.

In an embodiment, the pesticide compositions of the present invention comprise one or more essential oils enriched in thymol and/or carvacrol. Thymol and carvacrol are naturally occurring pesticides which are readily degraded in the environment. As such, there is little or no accumulation in the environment or in living organisms, even following repeated application of the pesticide compositions of the present invention.

Compositions of the present invention can include any number of combinations of ingredients discussed throughout this specification (e.g., phenolic compounds of natural origin, essential oils, surfactants, solvents, sequestering agents, water, etc.). It is also contemplated that that the concentrations of the ingredients can vary. In non-limiting embodiments, for example, the compositions may include in their final form, for example, at least about 0.0001%, 0.0002%, 0.0003%, 0.0004%, 0.0005%, 0.0006%, 0.0007%, 0.0008%, 0.0009%, 0.0010%, 0.0011%, 0.0012%, 0.0013%, 0.0014%, 0.0015%, 0.0016%, 0.0017%, 0.0018%, 0.0019%, 0.0020%, 0.0021%, 0.0022%, 0.0023%, 0.0024%, 0.0025%, 0.0026%, 0.0027%, 0.0028%, 0.0029%, 0.0030%, 0.0031%, 0.0032%, 0.0033%, 0.0034%, 0.0035%, 0.0036%, 0.0037%, 0.0038%, 0.0039%, 0.0040%, 0.0041%, 0.0042%, 0.0043%, 0.0044%, 0.0045%, 0.0046%, 0.0047%, 0.0048%, 0.0049%, 0.0050%, 0.0051%, 0.0052%, 0.0053%, 0.0054%, 0.0055%, 0.0056%, 0.0057%, 0.0058%, 0.0059%, 0.0060%, 0.0061%, 0.0062%, 0.0063%, 0.0064%, 0.0065%, 0.0066%, 0.0067%, 0.0068%, 0.0069%, 0.0070%, 0.0071%, 0.0072%, 0.0073%, 0.0074%, 0.0075%, 0.0076%, 0.0077%, 0.0078%, 0.0079%, 0.0080%, 0.0081%, 0.0082%, 0.0083%, 0.0084%, 0.0085%, 0.0086%, 0.0087%, 0.0088%, 0.0089%, 0.0090%, 0.0091%, 0.0092%, 0.0093%, 0.0094%, 0.0095%, 0.0096%, 0.0097%, 0.0098%, 0.0099%, 0.0100%, 0.0200%, 0.0250%, 0.0275%, 0.0300%, 0.0325%, 0.0350%, 0.0375%, 0.0400%, 0.0425%, 0.0450%, 0.0475%, 0.0500%, 0.0525%, 0.0550%, 0.0575%, 0.0600%, 0.0625%, 0.0650%, 0.0675%, 0.0700%, 0.0725%, 0.0750%, 0.0775%, 0.0800%, 0.0825%, 0.0850%, 0.0875%, 0.0900%, 0.0925%, 0.0950%, 0.0975%, 0.1000%, 0.1250%, 0.1500%, 0.1750%, 0.2000%, 0.2250%, 0.2500%, 0.2750%, 0.3000%, 0.3250%, 0.3500%, 0.3750%, 0.4000%, 0.4250%, 0.4500%, 0.4750%, 0.5000%, 0.5250%, 0.0550%, 0.5750%, 0.6000%, 0.6250%, 0.6500%, 0.6750%, 0.7000%, 0.7250%, 0.7500%, 0.7750%, 0.8000%, 0.8250%, 0.8500%, 0.8750%, 0.9000%, 0.9250%, 0.9500%, 0.9750%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, 4.0%, 4.1%, 4.2%, 4.3%, 4.4%, 4.5%, 4.6%, 4.7%, 4.8%, 4.9%, 5.0%, 5.1%, 5.2%, 5.3%, 5.4%, 5.5%, 5.6%, 5.7%, 5.8%, 5.9%, 6.0%, 6.1%, 6.2%, 6.3%, 6.4%, 6.5%, 6.6%, 6.7%, 6.8%, 6.9%, 7.0%, 7.1%, 7.2%, 7.3%, 7.4%, 7.5%, 7.6%, 7.7%, 7.8%, 7.9%, 8.0%, 8.1%, 8.2%, 8.3%, 8.4%, 8.5%, 8.6%, 8.7%, 8.8%, 8.9%, 9.0%, 9.1%, 9.2%, 9.3%, 9.4%, 9.5%, 9.6%, 9.7%, 9.8%, 9.9%, 10%, 11%, 12%, 13%, 14%, 15%, 16%, 17%, 18%, 19%, 20%, 21%, 22%, 23%, 24%, 25%, 26%, 27%, 28%, 29%, 30%, 35%, 40%, 45%, 50%, 60%, 65%, 70%, 75%, 80%, 85%, 90%, 95%, or 99% or more, or any range or integer derivable therein, of at least one of the ingredients mentioned throughout the specification and/or claims. In non-limiting aspects, the percentage can be calculated by weight or volume of the total composition. A person of ordinary skill in the art would understand that the concentrations can vary depending on the desired effect of the composition and/or on the product into which the composition is incorporated into.

The pesticide composition of the present invention may be used alone or in combination with one or more substances that are used in agricultural settings. i.e. as part of the supplements. Examples of substances include but are not limited to pesticides, such as disinfectants, fungicide, bactericide, virucide, insect repellent, arthropod repellent, nematicide, insecticide, acaricide, herbicide and plant growth regulators. Substances also include fertilizers, such as inorganic fertilizer, nitrogen fertilizer, potassium fertilizer, phosphate fertilizer, organic fertilizer, manure, compost, rock phosphate, bone meal, alfalfa, wood chips, langbeinite, cover crops, potassium sulfate, rock powder, ash, blood meal, fish meal, fish emulsion, algae, chitosan and molasses. Substances also include defoamers such as mineral oil, vegetable oil, paraffin wax, ester wax, silica, fatty alcohol, silicone, polyethylene glycol, polypropylene glycol copolymers and alkyl polyacrylates.

Pesticides

Most control measures are directed against inoculum of the pathogen and involve the principles of exclusion and avoidance, eradication, protection, host resistance and selection, and therapy. Control measures include the control of vectors of pathogens (insects and nematodes for example) and chemical control (pesticides). A variety of chemicals are available that have been designed to control plant diseases by inhibiting the growth of or by killing the disease-causing pathogens. Chemicals used to control bacteria (bactericides), fungi (fungicides), and nematodes (nematicides) may be applied to seeds, foliage, flowers, fruit, or soil. Soil treatments are designed to kill soil-inhabiting nematodes, fungi, and bacteria. This eradication can be accomplished using steam or chemical fumigants. Soilborne nematodes can be killed by applying granular or liquid nematicides. Most soil is treated well before planting; however, certain fungicides can be mixed with the soil at planting time. Seeds, bulbs, corms, and tubers are frequently treated with chemicals to eradicate pathogenic bacteria, fungi, and nematodes and to protect the seeds against organisms in the soil—mainly fungi—that cause decay and damping-off. Seeds are often treated with systemic fungicides, which are absorbed and provide protection for the growing seedling. Protective sprays and dusts applied to the foliage and fruit of crops and ornamentals include a wide range of organic chemicals designed to prevent infection. Protectants are not absorbed by or translocated through the plant; thus they protect only those parts of the plant treated before invasion by the pathogen. A second application is often necessary because the chemical may be removed by wind, rain, or irrigation or may be broken down by sunlight. New, untreated growth also is susceptible to infection. New chemicals are constantly being developed.

Aside from plant-diseases caused by organisms listed above, animals like rodents and birds are responsible for important pre-harvest damage. On a global scale, it was recently estimated that almost 280 million undernourished could additionally benefit if more attention were paid to reducing pre- and post-harvest losses by rodents. Rodents are hazardous, as they can amplify pathogens from the environment and form reservoirs of (zoonotic) disease. With application of proper rodent control methods, it is possible to reduce the hazards of rodent-borne diseases in areas where humans, food animals and rodents are living close to each other. These control measures include animal and birds repellents.

Any organism that damages crops or reduces the fertility of land can be defined as a pest. These include fungus, bacteria, virus, insects, nematodes, parasites, gastropods, arthropods, snails, slugs, vertebrates (mammal and birds), algae, etc. Chemical used to kill or repel pests are called pesticides. As reported by the EPA, here is a list of examples of pesticides:

TABLE 1

Examples of pesticides

| Pesticide | Targeted organism (pest) |
| --- | --- |
| Algicides | Control algae in lakes, canals, swimming pools, water tanks, and other sites. |
| Antifouling agents | Kill or repel organisms that attach to underwater surfaces, such as boat bottoms |
| Antimicrobials | Kill microorganisms (such as bacteria and viruses). |
| Attractants | Attract pests (for example, to lure an insect or rodent to a trap). (However, food is not considered a pesticide when used as an attractant.) |
| Biocides | Kill microorganisms. |
| Biopesticides | Biopesticides are certain types of pesticides derived from such natural materials as animals, plants, bacteria, and certain minerals. |
| Disinfectants and sanitizers | Kill or inactivate disease-producing microorganisms on inanimate objects. |
| Fungicides | Kill fungi (including blights, mildews, molds, and rusts) |
| Fumigants | Produce gas or vapor intended to destroy pests in buildings or soil. |
| Herbicides | Kill weeds and other plants that grow where they are not wanted. |
| Insecticides | Kill insects and other arthropods. |
| Miticides (also called acaricides) | Kill mites that feed on plants and animals. |
| Microbial pesticides | Microorganisms that kill, inhibit, or out compete pests, including insects or other microorganisms. |
| Molluscicides | Kill snails and slugs. |
| Nematicides | Kill nematodes (microscopic, worm-like organisms that feed on plant roots). |
| Ovicides | Kill eggs of insects and mites. |
| Pheromones | Biochemicals used to disrupt the mating behavior of insects. |
| Repellents | Repel pests, including insects (such as mosquitoes) and birds. |
| Rodenticides | Control mice and other rodents. |
| Defoliants | Cause leaves or other foliage to drop from a plant, usually to facilitate harvest. |
| Desiccants | Promote drying of living tissues, such as unwanted plant tops. |
| Insect growth regulators | Disrupt the molting, maturity from pupal stage to adult, or other life processes of insects. |
| Plant growth regulators | Substances (excluding fertilizers or other plant nutrients) that alter the expected growth, flowering, or reproduction rate of plants. |

Pesticides include a wide variety of substances usually targeting specific pests. Major chemical groups represented by pesticides are resumed in Table 2:

TABLE 2

Major Chemical Groups of pesticides

| CHEMICAL GROUP | TYPE OF PESTICIDE |
|---|---|
| Acetamide | herbicide |
| Acylalanine + Carboxamide + Dithiocarbamate + Neonicotinoid | fungicide/insecticide |
| Acylalanine + Triazole | fungicide |
| Acylalanines | fungicide |
| Acylalanines + Chloronitriles | fungicide |
| Amide | herbicide |
| Amide/Aniline | insecticide |
| Anilide | fungicide |
| Anilino Pyrimidine | fungicide |
| Antibiotic | fungicide |
| Aryloxphenoxy propionate | herbicide |
| Aryloxyphenoxy Acids | herbicide |
| Avermectin, Alcohol | miticide |
| Benzamide | herbicide |
| Benzamide + Dithiocarbamate | fungicide |
| Benzenamine | rodenticide |
| Benzimidazole | fungicide |
| Benzimidazole + Organophosphate + Phthalic Acid | insecticide/fungicide |
| Benzoic acid | herbicide |
| Benzothiadiazole | herbicide |
| Bipyridylium | herbicide |
| Carbamate (e.g. aldicarb, carbofuran, carbaryl, ethienocarb, fenobucarb, oxamyl, and methomyl) | Fungicide/growth regulator/ insecticide/miticide/ nematicide |
| Carbamate + Chloronitrile | fungicide |
| Carboxamide | fungicide |
| Carboxamide + Dithiocarbamate + Neonicotinoid | fungicide/insecticide |
| Carboxylic Acid | herbicide |
| Chlorinated Hydrocarbon | plant growth regulator |
| Chloroacetamide | herbicide |
| Chloro-nicotinyl | insecticide |
| Chloronitrile | fungicide |
| Chlorophenol | fungicide |
| Chlorophenyl | fungicide |
| Coumarin | rodenticide |
| Cyanoacetamide- | fungicide |
| Cyclohexanedione | Herbicide/plant growth regulator |
| Cyclohexanetrione | growth regulator |
| Dicarboximide | fungicide |
| Dinitroaniline | herbicide |
| Diphenylether | herbicide |
| Dithiocarbamate | fumigant, nematicide, fungicide, rodenticide, insecticide |
| Fatty Acid | insecticide/herbicide |
| Glycine | herbicide |
| Guanidine | fungicide |
| Halogenated Hydrocarbons | fumigant |
| Hydroxyanilide | fungicide |
| Hydroxycoumarin | rodenticide |
| Imidazolinone | herbicide |
| Indanedione | rodenticide & deer repellant |
| Inorganic | Fungicide, algicide, insecticide, rodenticide |
| Microbial | Bactericide, insecticide, fungicide |
| Morpholine | fungicide |
| Neonicontinoid + Triazole + Acylalanine + Phenylpyrrole | insecticide/fungicide |
| Nicotine | insecticide |
| Nitrile | herbicide |
| Nitro derivative | fungicide |
| nitroguanidine | insecticide |
| Organic Acid | Herbicide, plant growth regulator |
| Organochlorine | Insecticide, miticide |
| Organometallic | Fungicide, miticide |
| Organophosphate | insecticide/miticide/nematicide |

TABLE 2-continued

Major Chemical Groups of pesticides

| CHEMICAL GROUP | TYPE OF PESTICIDE |
|---|---|
| Organophosphate + Phthalic Acid | insecticide/fungicide |
| Oxadiazole | herbicide |
| Phenoxy | herbicide |
| Phenyl-Carbamate + Phenyl-Carbamate | herbicide |
| Phenylpyrrole + Triazole + Neonicotinoid + Acylalanine | fungicide/insecticide |
| Phthalamate | herbicide |
| Phthalic Acid + Organophosphate + Benzimidazole | insecticide/fungicide |
| Phthalimide | fungicide |
| Piperazine | fungicide |
| Pyrethrins | insecticide |
| Pyrethroid | insecticide |
| Pyridazinone | insecticide/miticide |
| Quaternary ammonium | Algaecide, disinfectant, herbicide |
| Quinolineacid | herbicide |
| Strobilurin | fungicide |
| Substituted benzoylurea | insecticide |
| Sulfonylurea | herbicide |
| Synethetic pyrethroid | insecticide |
| Tetrazine | miticide |
| Thiadiazole | fungicide |
| Thiocarbamate | herbicide |
| Triazapentadiene | insecticide |
| Triazine | fungicide |
| Triazole | fungicide |
| Uracil | herbicide |
| Urea | herbicide |
| dichloropropene | fumigant |
| dichloropropene + chlorpicrin | fumigant |
| metam sodium | fumigant, nematicide |
| oxine benzoate | fungicide |
| formaldehyde | fungicide, fumigant |
| stoddard solvent | herbicide |
| metaldehyde | molluscicide |
| ancymidol | plant growth regulator |
| ethephon | plant growth regulator |
| gibberellic acid | plant growth regulator |
| gibberellins + benazladenine | plant growth regulator |
| maleic hydrazide | plant growth regulator |
| NAA | plant growth regulator |
| napthalene acetamide | plant growth regulator |
| paclobutrazol | plant growth regulator |
| putrescent whole egg solids | repellents |
| strychnine | rodenticide |
| zinc phosphide | rodenticide |

It is well within the skill of the person skilled in the art to determine how much of any given pesticide may be added to the compositions of the present invention in order to obtain the pesticidal effect desired.

Fertilizers and Combined Use of Pesticides and Fertilizers

Fertilizers are defined as any material of natural or synthetic origin that is added to soil to supply one or more plant nutrients essential to the growth of plants. Fertilizers come in various forms. The most typical form is solid fertilizer in granulated or powdered forms. The next most common form is liquid fertilizer. Fertilizers typically provide, in varying proportions: six macronutrients: nitrogen (N), phosphorus (P), potassium (K), calcium (Ca), magnesium (Mg), and sulfur (S); eight micronutrients: boron (B), chlorine (Cl), copper (Cu), iron (Fe), manganese (Mn), molybdenum (Mo), zinc (Zn) and nickel (Ni). Fertilizers are broadly divided into organic fertilizers (composed of organic plant or animal matter), or inorganic or commercial fertilizers. Inorganic fertilizers include: ammonium nitrate, ammonium sulfate, ammonium thiosulfate, calcium ammonium nitrate, Calcium nitrate, Diammonium phosphate, monocalcium phosphate, potassium chloride, potassium nitrate, potassium sulfate and thermopotash. Organic fertilizers include: azomite, bioeffector, biofertilizer, compost, cottonseed meal, effluent spreading, feather meal, fish emulsion, fish hydrolysate, fish meal, manure, maxicrop, olive mill pomace, riverm, rockdust, seaweed fertiliser and slurry pit.

According to an embodiment, in agriculture, pesticides are used to limit damages caused by pests and stimulate growth, and can be used in combination with fertilizers.

It is well within the skill of the person skilled in the art to determine how much of any given fertilizer may be added to the compositions of the present invention in order to obtain the fertilizing effect desired.

Use and Application of the Composition of the Present Invention

In a second embodiment, there is disclosed a method of controlling pest, comprising contacting a soil, a seed, a plant, or combinations thereof, with pesticidal amount of the composition of the present invention. According to another embodiment, there is also disclosed a method comprising contacting a soil, a seed, a plant, or combinations thereof, with a pesticidal amount of a pesticide composition consisting of:

a) from about 0.01% to about 25% by weight of at least one antimicrobial compound selected from the group consisting of thymol and carvacrol;

b) from about 0.001% to about 15% by weight of surfactant sufficient to form a solution or dispersion of the phenolic compound in an aqueous carrier;

c) from about 0.001% to about 40% by weight of a solvent; and d) sufficient water to make 100 weight percent.

The compositions of the present invention may be used for soil disinfection (fungicide, bactericide, virucide), as well as vegetable, plant and vegetal matter disinfection, which include as non-limiting examples seeds, grains, plants, trees, bushes, roots, foliage, weed, fruits, flowers, crops, graftings, and the likes. The compositions of the present inventions may also be used as plant growth regulator, insect repellents, arthropod repellents, pesticides, insecticides, nematicides, acaricides, ovicides, larvicides and adulticides.

Crops with which the composition of the present invention may be used include, for example, but are not limited to banana, apple, pear, potato, rice, coffee, citrus, onions, ginseng, soy, weed, tomato.

According to another embodiment, the compositions of the present invention may be used for soil fertilization to improve crop growth and health.

Thus, according to another embodiment, there is also disclosed a method for regulating the growth of a plant, the method comprising contacting a soil, a seed, a plant, or combinations thereof, with a growth regulating amount of a composition according to the present invention. According to yet another embodiment, there is disclosed method for regulating the growth of a plant, the method comprising contacting a soil, a seed, a plant, or combinations thereof, with a growth regulating amount of a pesticide composition consisting of:

a) from about 0.01% to about 25% by weight of at least one antimicrobial compound selected from the group consisting of thymol and carvacrol;

b) from about 0.001% to about 15% by weight of surfactant sufficient to form a solution or dispersion of the phenolic compound in an aqueous carrier;

c) from about 0.001% to about 40% by weight of a solvent; and d) sufficient water to make 100 weight percent.

Crops with which the composition of the present invention may be used include, for example, but are not limited to banana, apple, pear, potato, rice, coffee, citrus, onions, ginseng, soy, weed, tomato.

According to an embodiment, regulating the growth comprises an increase in the number of fruit, vegetable, bulb or tuber from the plant. According to another embodiment, regulating the growth comprises an increase in the size of fruit, vegetable, bulb or tuber from the plant. According to another embodiment, regulating the growth comprises an increase in the number of healthy plants. In another embodiment, regulating the growth may be of particular importance to plants whose foliage of particular interest, such as lettuce or other varieties of plants whose leaves are edible. According to another embodiment, regulating the growth comprises a stimulation of fruit ripening. According to another embodiment, regulating the growth comprises inhibition of plant and shoot growth. According to another embodiment, regulating the growth an increase in flowering. According to another embodiment, regulating the growth comprises the regulation of leaf and fruit senescence.

According to another embodiment, the composition of the present invention may be used in improving the production of seeds. Thus, according to another embodiment, there is also disclosed a method for regulating the growth of a seed, the method comprising contacting a seed or a soil containing the seed thereof, with a growth regulating amount of a composition according to the present invention. According to yet another embodiment, there is disclosed method for regulating the growth of a seed, the method comprising contacting a seed or a soil containing the seed thereof, with a growth regulating amount of a pesticide composition consisting of:

a) from about 0.01% to about 25% by weight of at least one antimicrobial compound selected from the group consisting of thymol and carvacrol;

b) from about 0.001% to about 15% by weight of surfactant sufficient to form a solution or dispersion of the phenolic compound in an aqueous carrier;

c) from about 0.001% to about 40% by weight of a solvent; and d) sufficient water to make 100 weight percent.

Crops with which the composition of the present invention may be used include, for example, but are not limited to banana, apple, pear, potato, rice, coffee, citrus, onions, ginseng, soy, weed, tomato. Particularly, the seed may be a potato tuber, and the growth regulating effect may be an increase in the length of a potato tuber sprout.

The compositions of the present invention may be applied onto a surface to be disinfected by means of a variety of techniques. In an embodiment, the compositions of the present invention may be applied using means to aerially disperse the composition of the present invention, such as by spraying, volatilizing, sublimation, aerosol, fumigation, fogging. Suitable apparatus for such purpose include but are not limited to diffusers, mist blowers, or sprayers. According to another embodiment, the compositions of the present invention may be used for coating or soaking seeds, grains, roots, etc. According to yet another embodiment, the composition of the present invention may be spread over the soil in liquid or solid form. Further means of applying the compositions of the present invention are within the capacity of a skilled technician. The compositions of the present invention can either be applied directly or can be diluted prior to application. Dilution may be from about 1:1, to about 1:10000 (liquid:composition), in a suitable liquid such as water. Due to the substantially non-corrosive nature of the compositions of the present invention, the compositions can be readily applied without undue damage to the existing physical structure (i.e. surface).

According to other embodiments, the compositions of the present invention may be useful in other domains of application, such as for example as deodorizer or air freshener, as preservative in cosmetics products, as pet disinfectant, in the production of surfaces coated with biocides, in food production, for the disinfection of production plants and of food containers, the control of microbial growth in food and drinks, and the decontamination of carcasses, and as a food preservative; as a feed preservative in farming, as biocide for use in fish and shellfish farming, for example decontamination of fish eggs, ponds and equipment; as a wastewater disinfection solution; for the disinfection of cooling towers, as biocide in antifouling agents and paints in building/construction materials (including but not limited to wood, masonry, steel or other metallic materials, etc.), or marine anti-fouling paints and coatings; in fuels and plastic materials, as an animal and bird repellent, as a mole control products, as a herbicides in managing invasive species, for gardening and landscaping, and removing bracken, weed control, eg on pavements, industrial complexes and alongside roads and railways, parks and golf courses. The present invention will be more readily understood by referring to the following examples which are given to illustrate the invention rather than to limit its scope.

Example 1

Pesticide Solutions

Chemical and Physical Characteristics of the Pesticide Solutions

The sequestering agent (sodium citrate) was first dissolved in a predetermined amount of water and stirred until dissolution. Glycol ether PM (solvent), thymol, origanum oil and optionally citral (fragrance) were then added and stirred until dissolution. Surfactant (Sodium Lauryl Sulfate) and additional water were then added and stirred until dissolution to provide a 100 wt. composition. The final composition was stirred until a homogeneous solution was obtained. Composition 1, obtained from Composition 2 by means of dilution with water (1:100), is considered a "ready to use" composition.

TABLE 3

Exemplary pesticide solutions

| | Thymol Crystal | Origanum Oil/Citral | Sequestrant | Surfactant | Solvent | pH |
|---|---|---|---|---|---|---|
| A | 0.18 | 0.04 | 0.01 | 0.12 | — | 6.9 |
| B | 0.18 | 0.04 | 0.01 | — | 0.18 | 6.7 |
| C | 0.18 | 0.04 | — | 0.12 | 0.18 | 6.5 |
| 1 | 0.18 | 0.04 | 0.01 | 0.12 | 0.18 | 6.5 |
| D | 18 | 4 | 1 | 12 | — | 8.1 |
| E | 18 | 4 | 1 | — | 18 | 7.9 |
| 2 | 18 | 4 | 1 | 12 | 18 | 8.8 |
| 3 | 0.18 | 0.03 | 0.09 | 0.12 | 0.76 | 8.0 |
| 4 | 6 | 1 | 3 | 4 | 25 | 8.2 |

| | Solubility in Water | Stability | Foaming Effect | Foaming Effect in Hard Water |
|---|---|---|---|---|
| A | NO | NO | YES | YES |
| B | NO | NO | NO | YES |
| C | YES | YES | YES | NO |
| 1 | YES | YES | YES | YES |
| D | NO | NO | YES | n/a |
| E | NO | NO | NO | n/a |
| 2 | YES | YES | YES | n/a |
| 3 | YES | YES | YES | YES |
| 4 | YES | YES | YES | n/a | n/a: Not applicable this formula requires dilution before use

As illustrated hereinabove, the compositions are first formulated as a "concentrate" (Compositions 2 and 4), dilution of which provides for the preparation of Compositions 1 and 3. Compositions A, B, C, D, E, 1 and 2 comprise Origanum Oil/Citral (3:1). Compositions 3 and 4 do not comprise any fragrance (citral). The compositions have a pH ranging from about 6 to about 9. Dilution using hard water did not affect the characteristics of the composition which is indicative of the efficacy of the sequestering agent.

Example 2

Biological Efficacy of Selected Phenolic Compounds and Essential Oils

The minimum concentration at which a total antimicrobial activity (bactericidal activity) could be observed was determined for selected phenolic compounds of natural origin and selected essential oils using the AOAC method 955.15 ("Phenol Coefficient Method") with minor modifications. The results are indicative of the excellent antimicrobial activity of both thymol and carvacrol.

TABLE 4

Antimicrobial agent inhibitory concentration

| Antimicrobial Agent | Minimal Concentration (v/v %) |
|---|---|
| Thymol | 0.07 |
| Carvacrol | 0.07 |
| Eugenol | 0.4 |
| Citral | >1% |
| Thyme oil | 0.3 |
| Origanum oil | 0.2 |
| Eucalyptus oil | >1% |
| Lemon oil | >1% |

Different concentrations of essential oils and phenolic compounds of natural origin were incorporated into composition F (see table herein below) and inoculated with a 0.05% bacterial suspension of *Staphylococcus aureus*

(ATCC 6538; concentration of about 8 logs). After a contact time of 10 minutes, 0.1 ml of the inoculated solution was transferred to a broth culture with neutralizing (Difco 268110) and incubated over a period of 72 hours at 37° C. The presence of turbidity in the broth culture is indicative of the survival of the microorganism.

Example 3

Minimum Inhibitory Concentration (MIC) of Selected Phenolic Compounds

The minimum inhibitory concentration (MIC) is the lowest concentration of an antimicrobial that will inhibit the visible growth of a microorganism after overnight incubation. Minimum inhibitory concentrations are important in diagnostic laboratories to monitor the activity of new antimicrobial agent. An MIC is generally regarded as the most basic laboratory measurement of the activity of an antimicrobial agent against an organism. The MIC of thymol and carvacrol were determined against several organisms (including geophilic fungi Trichophyton mentagrophytes and Microsporum gypseum) and are reported in Table 5. The MIC values go from 0.0006% to 0.06% depending on the tested microorganism.

TABLE 5

MIC of thymol and carvacrol

| Domain | Specie | MIC of Thymol (v/v %) | MIC of carvacrol (v/v %) |
|---|---|---|---|
| Bacteria, gram+ | Staphylococcus aureus ATCC43300 [1] | 0.06 | 0.015 |
| Bacteria, gram+ | Staphylococcus aureus ATCC6538 [2] | 0.014 | 0.0175 |
| Bacteria, gram+ | Staphylococcus epidermidis ATCC12228 [1] | 0.06 | 0.03 |
| Bacteria, gram− | Pseudomonas aeruginosa ATCC2730 [2] | 0.0385 | 0.045 |
| Bacteria, gram− | Treponema phagedaenis-like [3] | 0.0006 | n.d. |
| Yeast | Candida albicans ATCC10231 [4] | 0.016 | 0.016 |
| Yeast | Candida tropicalis ATCC13803 [4] | 0.016 | 0.016 |
| Fungus | Epidermophyton floccosum FF9 [4] | 0.016 | 0.008 |
| Fungus | Trichophyton rubrum FF5 [4] | 0.016 | 0.008 |
| Fungus | Trichophyton mentagrophytes FF7 [4] | 0.016 | 0.004 |
| Fungus | Microsporum canis FF1 [4] | 0.008 | 0.004 |
| Fungus | Microsporum gypseum FF3 [4] | 0.016 | 0.004 |
| Fungus | Aspergillus niger ATCC16404 [4] | 0.016 | 0.016 |
| Fungus | Aspergillus fumigatus ATCC46645 [4] | 0.016 | 0.016 |

[1] A. Nostro et al. FEMS Microbiology Letters 230 (2004) 191-195
[2] R. J. W. Lambert et al. Journal of Applied Microbiology 91 (2001) 453-462
[3] D. Döpfer et al. Proceedings of the 9th International Conference on Lameness in Ruminants (2013) 228-229
[4] E. pinto et al. J Med Microbiol 55 (2006) 1367-1373

Example 4

Quantitative Microbial Reduction Assay

The antimicrobial activity for selected compositions of the present invention was determined. Several compositions comprising a phenolic compound of natural origin or an essential oil (0.18%) were tested to determine their effectiveness in reducing the load of Staphylococcus aureus (ATCC 6538). The solutions were prepared from a concentrate and diluted with water (1:100). The results are indicative of the high efficiency of Compositions 5, 6 and 7 in reducing the load of Staphylococcus aureus.

TABLE 6

Antimicrobial efficacy of antimicrobial agents

| | Antimicrobial Agent (w/w) | Sequestrant (w/w) | Surfactant (w/w) | Solvent (w/w) | Log Reduction |
|---|---|---|---|---|---|
| F | — | 0.01 | 0.12 | 0.18 | 0.60 |
| 5 | Thymol | 0.01 | 0.12 | 0.18 | 7.63 |
| 6 | Carvacrol | 0.01 | 0.12 | 0.18 | 7.63 |
| G | Eugenol | 0.01 | 0.12 | 0.18 | 2.50 |
| H | Citral | 0.01 | 0.12 | 0.18 | 2.04 |
| I | Thyme oil | 0.01 | 0.12 | 0.18 | 3.06 |
| 7 | Origanum oil | 0.01 | 0.12 | 0.18 | 7.63 |
| J | Eucalyptus oil | 0.01 | 0.12 | 0.18 | 0.71 |
| K | Lemon oil | 0.01 | 0.12 | 0.18 | 0.64 |

Different compositions of the present invention were inoculated with 0.05% of a bacterial culture of Staphylococcus aureus (ATCC 6538) freshly incubated over a period of 48 hours at 37° C. in an optimal growth medium. After a contact time of 10 minutes, 0.1 ml of the inoculated solution was seeded at different dilutions on TSA agar (Difco 255320) with neutralizing to determine the residual microbial load. The log reduction was determined by calculating the logarithm of the residual charge obtained with the reference composition (i.e. water) and comparing it with the residual charge obtained using any of the compositions comprising either a phenolic compound or an essential oil.

Example 5

Biological Efficacy of Composition 1 on Selected Microorganisms

The pesticide compositions of the present invention exhibit a broad spectrum of activity on a variety of microorganisms. As shown herein below, the efficacy of Composition 1 against a variety of microorganisms was determined.

TABLE 7

Efficacy of composition 1 on selected microorganisms

| Activity | Standard Method | Group of Microorganisms | Microorganism | 1 |
|---|---|---|---|---|
| Bactericidal | AOAC[1] (Dilution Test) | Bacteria Gram− | Salmonella cholerasuis | Pass |
| | | Bacteria Gram+ | Staphylococcus aureus | Pass |
| Fungicide | AOAC Fungicidal Activity Test | Fungus | Trichophyton mentagrophytes | Pass |
| Virucidal | ASTM[2] Efficacy of Virucidal Agents | Virus | Influenza A | Pass |

[1]Association of Analytical Communities,
[2]American Society for Testing and Materials Example 6

Toxicity of the Pesticide Compositions

Toxicity tests ($LD_{50}$) were performed on selected ingredients of the pesticide compositions of the present invention. Composition 1 was determined as having a $LD_{50}$ of >15 g/Kg (substantially non-toxic).

TABLE 8

| Toxicity ingredients | | |
| --- | --- | --- |
| Ingredient | $LD_{50}$ Oral-rat | Specification |
| Thymol | 980 mg/kg | USP, FCC |
| *Origanum* oil | 1850 mg/kg | USP, FCC |
| Citral | 4960 mg/kg | Oxford University |
| Sodium Citrate | >8 g/kg | USP, FCC |
| Sodium Lauryl Sulfate | 1288 mg/kg | USP, FCC |
| Glycol Ether PM | 5 210 mg/kg | WHMIS |

Example 7

Demonstration that all Types of Surfactants can be Used in the Pesticide Composition of the Present Invention Surfactants can be grouped by the charge characteristics of their polar head groups. The four groups are:
1. Anionic: Negative charge on the polar head group. These include surfactants like sulfates, sulfonic acids and carboxylic acids.
2. Cationic: Positive charge on the polar head group. These include surfactants like amines and Quaternized Ammonium Compounds (Quats).
3. Amphoteric: Can have both positive and negative charge. Primarily used as secondary surfactants. These include betaines and imidazolium compounds.
4. Non-ionic: No specific charge. By far the most frequently used surfactants. These include alcohols, alkanolamides, esters and amine oxides.

The antimicrobial efficacy of the compositions of the present invention is evaluated with all types of surfactants. The different compositions tested differ only for the surfactant. All compositions are based on the general formula presented in Table 9. The different surfactants tested are presented in Table 10. The surfactants were tested at a concentration of 0.12% (w/w) and or/0.35% (w/w).

TABLE 9

| General formula of compositions 1 to 68 | |
| --- | --- |
| Ingredient | % (w/w) |
| Thymol | 0.23 |
| Surfactant | 0.12-0.35 |
| Solvent | 0.9 |
| Sequestrant | 0.09 |
| Water | Q.S. |

TABLE 10

| Surfactants tested in compositions 1 to 68 | | | | |
| --- | --- | --- | --- | --- |
| # | Type | Chemical group | INCI Name | # CAS |
| 1 | Anionic | Alpha Sulfo Methyl Ester | Sodium Methyl 2-Sulfolaurate (and) Disodium 2-Sulfolaurate | 149458-07-1 |
| 2 | Anionic | Diphenyl Oxide Disulfonate | Sodium Dodecyl Diphenyl Ether Disulfonate | 119345-04-9 |
| 3 | Anionic | Diphenyl Oxide Disulfonate | Sodium Decyl Diphenyl Oxide Disulfonate | 36445-71-3 |
| 4 | Anionic | Dodecylbenzene Sulfonic Acid & Salts | Sodium Dodecylbenzenesulfonate | 68081-81-2 |
| 5 | Anionic | Dodecylbenzene Sulfonic Acid & Salts | Dodecylbenzene Sulfonic Acid | 68584-22-5 |
| 6 | Anionic | ether carboxylate | Capryleth-9 carboxylic acid/ hexeth-4 carboxylic acid | 53563-70-5 and 105391-15-9 |
| 7 | Anionic | ether carboxylate | Glycolic Acid Ethoxylate Lauryl Ether | 27306-90-7 |
| 8 | Anionic | Isethionate | Sodium Cocoyl Isethionate | 61789-32-0 |
| 9 | Anionic | Lauryl Ether Sulfates | Sodium lauryl ether sulfate | 9004-82-4 |
| 10 | Anionic | Lauryl Sulfates | Sodium Lauryl Sulfate | 151-21-3 |
| 11 | Anionic | Lauryl Sulfates | Triethanolamine Lauryl Sulfate | 90583-18-9 |
| 12 | Anionic | Lauryl Sulfates | Magnesium Lauryl Sulfate | 3097-08-3 |
| 13 | Anionic | Phosphate Esters | Nonoxynol-10 Phosphate | 51609-41-7 |
| 14 | Anionic | Phosphate Esters | Deceth 4 Phosphate | 68921-24-4 |
| 15 | Anionic | Phophanates | Amino tri (methylene phosphonic acid) pentasodium salt, Na5ATMP | 20592-85-2 |
| 16 | Anionic | Phophanates | 1-Hydroxyethylidene-1,1,-diphosphonic acid | 2809-21-4 |
| 17 | Anionic | Sarcosinate | Sodium Lauroyl Sarcosinate | 137-16-6 |
| 18 | Anionic | Sulfosuccinates | Disodium Laureth Sulfosuccinate | 68815-56-5 |
| 19 | Anionic | Xylene Sulfonates | Sodium Xylene Sulfonate | 1300-72-7 |
| 20 | Cationic | Amine Oxides | Lauramine Oxide | 1643-20-5 |
| 21 | Cationic | Amine Oxides | Cocamidopropylamine Oxide | 68155-09-9 |
| 22 | Cationic | Amine Oxides | Lauryl/Myristyl amidopropyl amine oxide | 61792-31-2 and 67806-10-4 |
| 23 | Cationic | Amine Oxides | tallow amine + 2 EO | 61791-46-6 |
| 24 | Cationic | Amine Oxides | Myristamine Oxide | 3332-27-2 |
| 25 | Cationic | Onium compound | Soyethyl morpholinium ethosulfate | 61791-34-2 |
| 26 | Cationic | Quaternized Ammonium Compound | Dioleoylethyl hydroxyethylmonium methosulfate | 94095-35-9 |

TABLE 10-continued

Surfactants tested in compositions 1 to 68

| # | Type | Chemical group | INCI Name | # CAS |
|---|---|---|---|---|
| 27 | Cationic | Quaternized Ammonium Compound | Quaternium 18 (Distearyl Dimethyl Ammonium Chloride) | 61789-80-8 |
| 28 | Cationic | Quaternized Ammonium Compound | Alkyl Dimethyl Benzyl Ammonium Chloride | 68424-85-1 |
| 29 | Cationic | Quaternized Ammonium Compound | Quaternium 12 (Didecyl Dimethyl Ammonium Chloride) | 7173-51-5 |
| 30 | Cationic | Quaternized Ammonium Compound | Dialkyl dimethyl ammonium chloride | 68424-95-3 |
| 31 | Amphoteric | Betaine | Cocamidopropyl Betaine | 61789-40-0 |
| 32 | Amphoteric | Betaine | Cetyl Betaine | 693-33-4 and 683-10-3 |
| 33 | Amphoteric | Betaine | Lauramidopropyl Betaine | 4292-10-8 |
| 34 | Amphoteric | Imidazolium compound | Disodium Cocoamphodipropionate | 68604-71-7 |
| 35 | Amphoteric | Imidazolium compound | Disodium Cocoamphodiacetate | 68650-39-5 |
| 36 | Amphoteric | Imidazolium compound | Sodium Cocoamphoacetate | 68608-65-1 |
| 37 | Amphoteric | Sultaine | Lauryl Hydroxysultaine | 13197-76-7 |
| 38 | Nonionic | Alcohol Ethoxylates | Linear alcohol (C11) ethoxylate, POE-7 | 34398-01-1 |
| 39 | Nonionic | Alcohol Ethoxylates | Linear alcohol (C9-11) ethoxylate, POE-2.5 | 68439-46-3 |
| 40 | Nonionic | Alcohol Ethoxylates | Lauryl alcohol ethoxylate, POE-8 | 9002-92-0 |
| 41 | Nonionic | Alcohol Ethoxylates | Secondary Alcohol Ethoxylates | 84133-50-7 |
| 42 | Nonionic | Alkanolamides | Trideceth-2 Carboxamide MEA | 107628-04-6 |
| 43 | Nonionic | Alkanolamides | PEG-4 Rapeseedamide | 85536-23-8 |
| 44 | Nonionic | Alkanolamides | PEG 5 Cocamide | 68425-44-5 |
| 45 | Nonionic | Alkanolamides | Cocamide DEA | 68603-42-9 |
| 46 | Nonionic | Alkanolamides | Lauramide MEA | 142-78-9 |
| 47 | Nonionic | Alkanolamides | Cocamide MEA | 68140-00-1 |
| 48 | Nonionic | Alkanolamides | Lauramide DEA | 120-40-1 |
| 49 | Nonionic | Alkanolamides | Oleamide DEA | 93-83-4 |
| 50 | Nonionic | Alkyl polyglycosides | Caprylyl/Myristyl Glucosid | 68515-73-1 and 110615-47-9 |
| 51 | Nonionic | Alkyl polyglycosides | Lauryl/Myristyl Glucosid | 110615-47-9 |
| 52 | Nonionic | Alkyl polyglycosides | Caprylyl/Decyl Glucoside | 68515-73-1 |
| 53 | Nonionic | Amide | N,N-Dimethyldecanamide | 14433-76-2 |
| 54 | Nonionic | Biosurfactant | Sophorolipid | — |
| 55 | Nonionic | Esters | Isopropyl Myristate | 110-27-0 |
| 56 | Nonionic | Esters | Isopropyl Palmitate | 142-91-6 |
| 57 | Nonionic | Fatty acid, natural origin | Glycereth-17 Cocoate | 68201-46-7 |
| 58 | Nonionic | Fatty acid, natural origin | Glycereth-6 Cocoate | 68201-46-7 |
| 59 | Nonionic | Fatty acid, natural origin | PEG/PPG-6/2 Glyceryl cocoate | 72245-11-5 |
| 60 | Nonionic | Fatty Alcohol | Cetostearyl Alcohol | 67762-27-0 |
| 61 | Nonionic | Fatty Amine Ethoxylate | PEG 2 Cocamine | 61791-14-8 |
| 62 | Nonionic | Fatty Amine Ethoxylate | PEG 2 Tallow Amine | 61791-26-2 |
| 63 | Nonionic | Glycerol ester | Glycereth-7 Caprylate/Caprate | 36145938-3 |
| 64 | Nonionic | Glycerol ester | caprylic/capric triglyceride | 73398-61-5 |
| 65 | Nonionic | Glycerol ester | Glyceryl oleate | 37220-82-9 |
| 66 | Nonionic | Glycerol ester | Glyceryl stearate | 123-94-4 |
| 67 | Nonionic | Lactate | Lauryl Lactyl Lactate | 910661-93-7 |
| 68 | Nonionic | Sorbitan Ester | Polysorbate 80 | 9005-65-6 |

Antimicrobial Efficacy Test 0.1 mL of bacterial culture containing *Staphylococcus aureus* is inoculated in a tube containing 10 mL of a given composition. The content of the tube is then mixed and left to stand for 2 minutes (the "contact time"). After 2 minutes, 0.01 mL of tube content is transferred to a tube containing 9 mL of a neutralizing bacterial culture media (Letheen Broth) that stops the antimicrobial action of the composition and allows microbial growth. Tubes are then checked for presence of microbial growth after 72 h. For each antimicrobial efficacy test, the plating of positive controls followed by colony counting was done to establish the log reduction of *S. aureus* as a result of 2 minutes contact with compositions 1-68. If no growth is observed in the tested tube, the composition is considered to kill at least the bacterial load of the positive control.

Table 11 presents the results of the efficacy tests for compositions 1-68. The Log reduction of S. aureus is indicated for each composition. Each composition is formulated with the different surfactants at a concentration of 0.12 and/or 0.35% weight.

TABLE 11

Antimicrobial efficacy results against *Staphylococcus aureus*.

| Composition | | Surfactant at 0.35% (w/w) Log reduction | Surfactant at 0.12% (w/w) Log reduction |
|---|---|---|---|
| Anionic | 1 | >7.98 | >5.84 |
| | 2 | >5.04 | >5.84 |
| | 3 | >5.04 | N/A |
| | 4 | >7.98 | N/A |
| | 5 | >5.51 | >5.64 |
| | 6 | >5.76 | >5.64 |
| | 7 | >5.76 | >5.64 |
| | 8 | >5.76 | >5.64 |
| | 9 | >7.98 | >5.84 |
| | 10 | >7.98 | >5.84 |
| | 11 | >5.04 | >5.64 |
| | 12 | >5.04 | >5.64 |
| | 13 | >5.04 | >5.64 |
| | 14 | >5.04 | >5.64 |
| | 15 | >7.98 | N/A |
| | 16 | >7.98 | >5.84 |
| | 17 | >7.98 | N/A |
| | 18 | >5.04 | >5.64 |
| | 19 | >5.04 | >5.64 |
| Cationic | 20 | >4.43 | N/A |
| | 21 | >4.43 | >5.64 |
| | 22 | >5.72 | >5.64 |
| | 23 | >4.43 | >5.64 |
| | 24 | N/A | N/A |
| | 25 | >7.98 | N/A |
| | 26 | >5.76 | >5.64 |
| | 27 | N/A | >5.64 |
| | 28 | >5.04 | >5.64 |
| | 29 | >5.04 | >5.64 |
| | 30 | >7.98 | >5.84 |
| Amphoteric | 31 | >5.72 | >5.64 |
| | 32 | >4.43 | >5.64 |
| | 33 | >5.04 | >5.64 |
| | 34 | >5.04 | >5.84 |
| | 35 | >5.04 | >5.64 |
| | 36 | >5.04 | >5.64 |
| | 37 | >5.76 | >5.64 |
| Non-ionic | 38 | >4.43 | >5.64 |
| | 39 | >5.76 | N/A |
| | 40 | N/A | >5.64 |
| | 41 | N/A | >5.64 |
| | 42 | N/A | >5.64 |
| | 43 | >4.43 | >5.84 |
| | 44 | >4.43 | N/A |
| | 45 | >7.98 | >5.84 |
| | 46 | >5.04 | >5.64 |
| | 47 | >4.43 | >5.64 |
| | 48 | N/A | >5.64 |
| | 49 | >4.43 | >5.64 |
| | 50 | >7.98 | >5.84 |
| | 51 | >7.98 | >5.84 |
| | 52 | >7.98 | N/A |
| | 53 | N/A | >5.64 |
| | 54 | >6.43 | >5.64 |
| | 55 | N/A | >5.64 |
| | 56 | N/A | >5.84 |
| | 57 | >4.43 | N/A |
| | 58 | >5.76 | >5.64 |
| | 59 | >4.43 | >5.64 |
| | 60 | >4.43 | >5.64 |
| | 61 | >5.51 | >5.64 |
| | 62 | N/A | >5.64 |
| | 63 | >5.76 | >5.64 |
| | 64 | >4.43 | >5.64 |
| | 65 | >7.98 | >5.84 |

TABLE 11-continued

Antimicrobial efficacy results against *Staphylococcus aureus*.

| Composition | Surfactant at 0.35% (w/w) Log reduction | Surfactant at 0.12% (w/w) Log reduction |
|---|---|---|
| 66 | N/A | >5.64 |
| 67 | >5.76 | >5.64 |
| 68 | >4.43 | >5.64 |

Conclusions

Each type of surfactants (anionic, cationic, amphoteric and non-ionic) was tested in the pesticide composition of the present invention. Compositions 1-68 covered the different types of surfactants, but also the most common chemical groups of surfactants available on the market. The composition of the present invention therefore can be formulated with any surfactant, while maintaining the antimicrobial efficacy.

From the results found in Table 11, it is clear that compositions 1-68 of the present invention maintain antimicrobial efficacy with a contact time of 2 minutes.

Example 8

Efficacy Against Major Pests: Weed

Weed control remains a major concern in agriculture. The presence of weeds can result in a significant crop yield reduction, quality loss and harvesting difficulties. The herbicidal efficacy of compositions of the present invention was tested 1) on seed germination of two weed species and 2) the phytotoxicity effect of compositions of the present invention on seedlings of two weed species.

Compositions

The compositions are prepared with the % (w/w) of ingredients found in Table 12.

TABLE 12

Compositions tested

| Composition | 8 | 9 | 10 | 11 | 12 |
|---|---|---|---|---|---|
| Thymol % | 0.23 | 0.46 | 1.15 | 2.30 | 23.00 |
| Surfactant % | 0.12 | 0.24 | 0.60 | 1.20 | 12.00 |
| Solvent % | 0.36 | 0.72 | 1.80 | 3.60 | 36.00 |
| Water % | Q.S. | Q.S. | Q.S. | Q.S. | Q.S. |

Experiment 1: Composition 8, 9 and 12 efficacy was evaluated in comparison with the control treatment receiving water only. Each experimental unit consisted of a Petri dish containing a filter paper and 25 seeds per weed species. The two weed species tested were a dicotyledonous, common ragweed, and a monocotyledonous, barnyard grass. Five milliliters of each compositions were poured into the Petri-plate containing seeds, which was subsequently sealed. There were four replicates per concentration. The Petri dishes were placed in a growth chamber at 27° C. with a photoperiod of 16:8 (day:night). Treatments were arranged in a completely randomized design. Germination was evaluated every two or three days for 21 days of incubation. At each observation date, the number of germinated seeds (with visible radicle) was counted and removed from the Petri. At the end of the test, non-germinated seeds were submitted to the tetrazolium test (Peters 2000) to assess their viability. Seed coat was incised with a scalpel and soaked in a 1% triphenyl tetrazolium chloride solution for 12 hours. Seeds were then dissected under binocular in order to reveal the embryo structure. The living tissues turned red and dead tissues did not stain. Each embryo was examined and difference in staining color on seed tissue was interpreted to determine the seed viability. Cumulative mortality was adjusted to take into account the natural mortality in the control.

Figure 2:
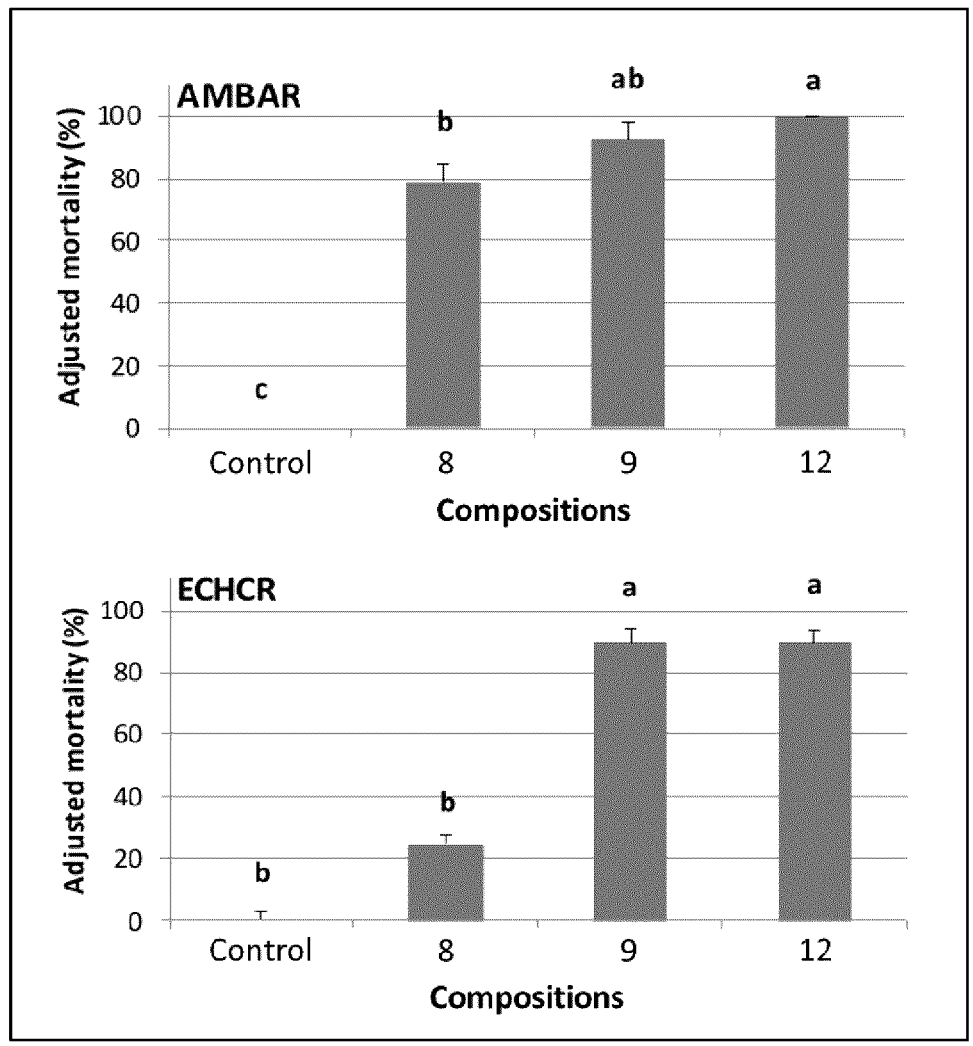
FIG. 2 illustrates the adjusted seed mortality of common ragweed (AMBAR) and barnyard grass (ECHCR) for the different compositions, after 21 days in Petri dishes. Columns with the same letter are not significantly different according to Fisher's Protected LSD at $\alpha=0.05$. Vertical bars represent ±SE.

Results: The total germination in the control treatment was 64 and 87% for common ragweed (AMBAR) and barnyard grass (ECHCR) respectively. Seed germination was delayed when compositions 8, 9 and 12 were applied (FIG. 1). There was no germination of ragweed seeds with composition 12 while 9% of the seeds of barnyard grass were able to germinate. Mortality increased as concentration of thymol in the compositions increased to reach a maximum of 100% for ragweed and 90% for barnyard grass (FIG. 2).

Experiment 2: Seedlings of two weed species (common ragweed and barnyard grass) were transplanted into 50-multi-cell trays filled with potting soil. In total, 480 seedlings were transplanted: compositions 8, 9, 10, 11, 12×10 plants/concentration×2 weed species×4 replications. After 3 days, when transplanted seedlings were well established into multi-cell trays, they were sprayed with the different compositions by using a hand pump sprayer, at a volume application rate of 225 l ha$^{-1}$. The growing stages of weeds at spraying time ranged from 2 to 4 leaves and 3 to 5 leaves, respectively for common ragweed and barnyard grass. The trays were placed in a growth chamber at 25° C. with a photoperiod of 16:8 (day:night) throughout the test. Treatments were arranged in a completely randomized design. Assessments of phytotoxicity were performed one week after spraying in each replicate for incidence (percentage of affected plants) and severity (affected leaf and stem area). "Weighed severity" was expressed by using a scale with five classes: (1: slight; 2: moderate; 3: high; 4: very high; 5: dead plant).

Figure 3:
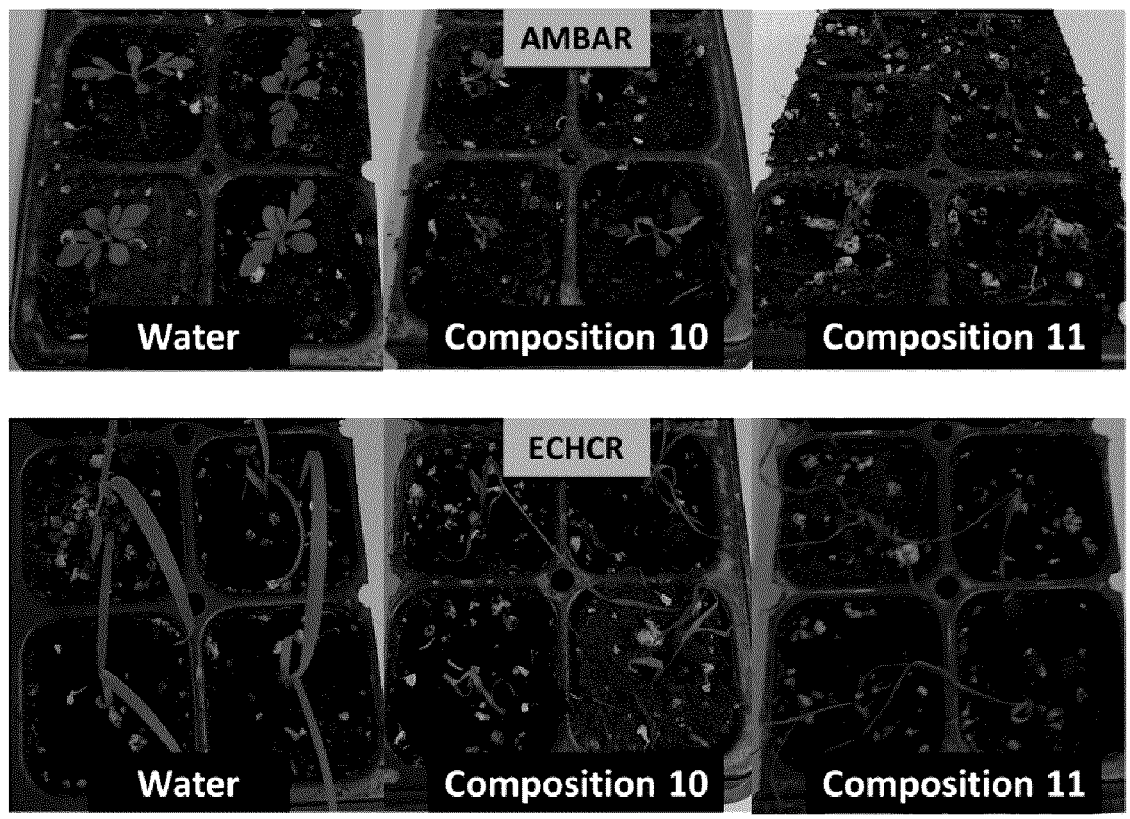
FIG. 3 illustrates a visual symptoms of water, compositions 10 and 11 phytotoxicity observed on common ragweed (AMBAR) and barnyard grass (ECHCR).

Results: Visual symptoms of injury were readily apparent. Phytotoxicity severity on leaves and stems increased as concentration of thymol in the compositions increased (FIG. 3, Table 13).

TABLE 13

Compositions phytoxicity incidence and severity on common ragweed and barnyard grass seedlings [1].

| Species | Composition | Incidence (%) | Weighed severity |
|---|---|---|---|
| AMBAR [2] | Water | 0.0 c | 0.00 e |
| | 8 | 35.0 b | 1.00 d |
| | 9 | 92.5 a | 2.25 c |
| | 10 | 100.0 a | 3.85 b |
| | 11 | 100.0 a | 4.78 a |
| | 12 | 100.0 a | 5.00 a |
| ECHCR [3] | Water | 0.0 c | 0.00 d |
| | 8 | 40.0 b | 1.14 c |
| | 9 | 100.0 a | 1.30 c |
| | 10 | 100.0 a | 3.58 b |
| | 11 | 100.0 a | 4.72 a |
| | 12 | 100.0 a | 5.00 a |

[1] Means with the same letter are not significantly different according to Fisher's Protected LSD at P = 0.05.
[2] AMBAR: common ragweed.
[3] ECHCR: barnyard grass.

Conclusions: As demonstrated above, compositions of the present invention have herbicidal activity on common ragweed and barnyard grass. Weed seed germination was reduced and the aerial parts of plants were injured significantly by compositions 8, 9, 10, 11 and 12 meaning the compositions are acting as contact herbicides when applied pre and post-emergence of weed seedlings.

Example 9

Efficacy Against Major Pests: Insects and Mites

Bioassays on two biological models, major pests in fruit and vegetable production, the codling moth, *Cydia pomonella* (L.) and the two-spotted spider mite, *Tetranychus urticae* Koch were conducted. The insecticidal effect (ovicidal) of compositions of the present invention on eggs of codling moth (CM) and the acaricidal effect of compositions of the present invention on two-spotted spider mite (TSSM) were evaluated.

Compositions

The compositions are prepared with the % (w/w) of ingredients found in Table 14.

TABLE 14

| Compositions tested | | |
|---|---|---|
| Composition | 8 | 10 |
| Thymol % | 0.23 | 1.15 |
| Surfactant % | 0.12 | 0.60 |
| Solvent % | 0.36 | 1.80 |
| Water % | Q.S. | Q.S. |

Part I.

Evaluate the insecticidal effect (ovicidal) of compositions of the present invention on eggs of the codling moth. Codling moth (CM) eggs and adults were obtained from OKSIR (Kelowna, BC) and have been used for laboratory rearing in a growth chamber. Adults were placed in plastic bags to allow egg laying. Compositions 8 and 10 were evaluated and compared to a control composed of water. Topical application was used to evaluate insecticidal effect on CM eggs. Eggs laid less than 24 h were collected. Groups of 15 eggs were placed in Petri dishes and considered as a replicate. Ten replicates were sprayed for each composition. Petri dishes were placed under rearing condition. The effect of treatments on egg hatching was assessed 7 d after spraying (after completion of egg development). Data were analysed by a one-way analysis of variance followed by the HSD Tukey-Kramer test to compare the treatments. The critical point (α) was determined at 0.05.

Figure 4:
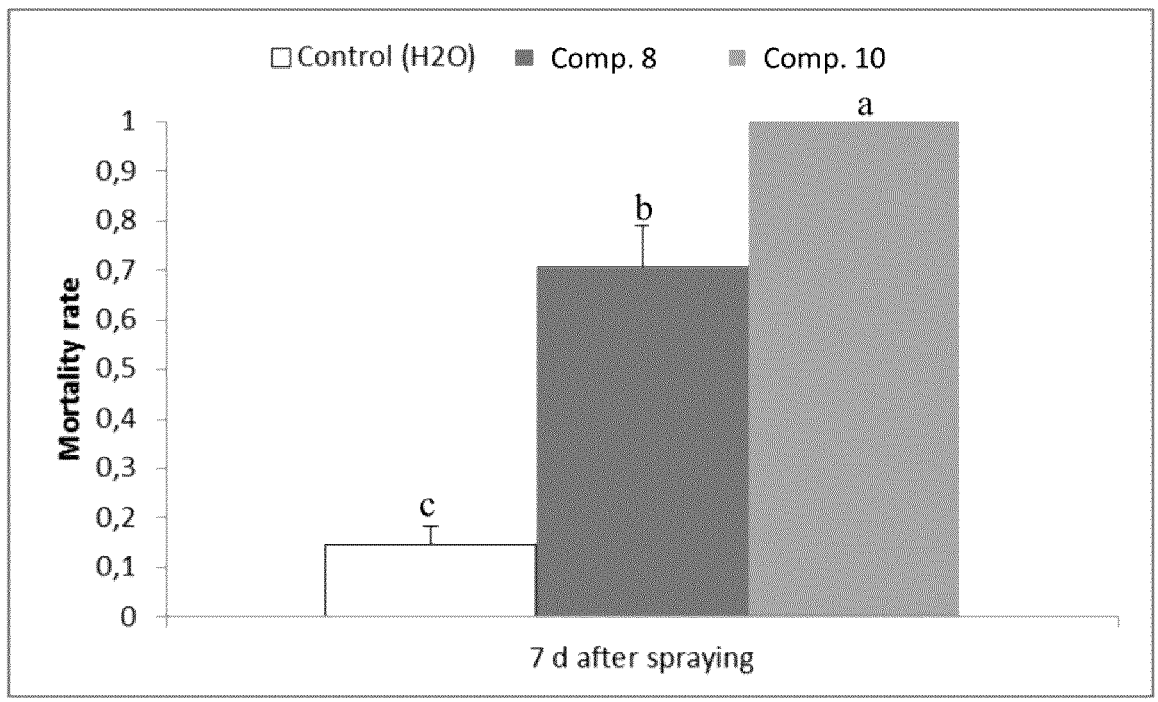
FIG. 4 illustrates the mean rates (±SE) of codling moth egg mortality observed 7 days after spraying. Treatments with different letters are significantly different (ANOVA, HSD Tukey-Kramer test, $\alpha=0.05$).
Figure 5:
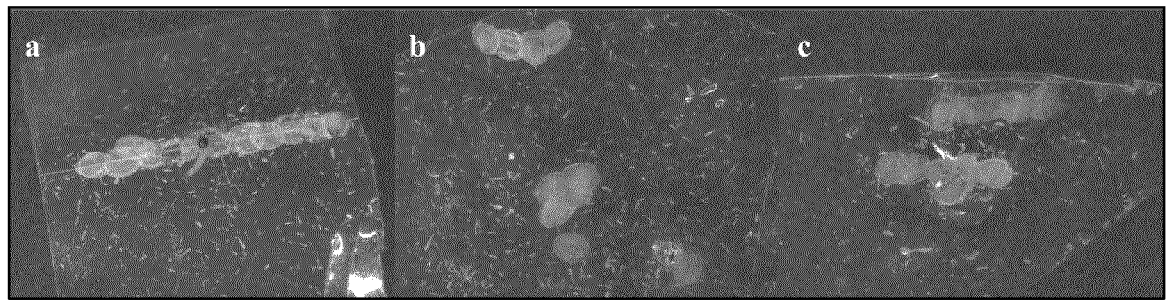
FIG. 5 illustrates the codling moth eggs seven days after spraying with water (control) (a), composition 8 (b) and composition 10 (c).

Results:

Treatments were significantly different with higher mortality rates for compositions 8 and 10 compared to the control (FIG. 4). The highest mortality rate was observed for composition 10. Control eggs showed a normal development (FIG. 5a). Treated eggs with composition 8 seemed to have started embryogenesis but most of them did not complete it. These eggs had liquid vitellus (FIG. 5b). Most of the eggs treated composition 10 were dried and mortality reached 100% seven days after spraying (FIG. 5c).

Part II.

Evaluate the acaricidal effect of compositions of the present invention on the two-spotted spider mite (TSSM). The TSSM were obtained from Anatis Bioprotection (St-Jacques-le-Mineur, QC) and have been used for laboratory rearing on young bean plants (*Phaseolus vulgaris* (L.) cv. Gold rush). Only motile forms were used for bioassay. Compositions 8 and 10 were evaluated and compared to a control composed of water. Topical application was used to evaluate acaricidal effect on motile forms of TSSM. Fifteen TSSM were deposited on a young Lima bean leaf, underside up, resting on a 1.5% agar in Petri dishes and considered as a replicate. Ten replicates were sprayed. Petri dishes were placed under rearing condition. Mortality was evaluated 24 h after spraying. Data were analysed at each sampling date by a one-way analysis of variance followed by the HSD Tukey-Kramer test to compare the treatments. The critical point ($\alpha$) was determined at 0.05.

Figure 6:
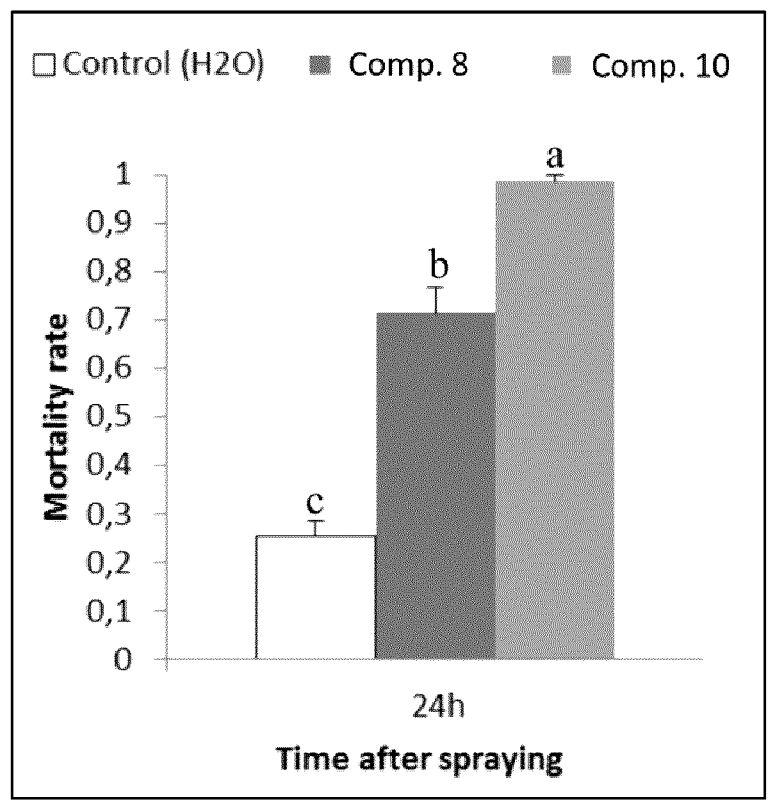
FIG. 6 illustrates the mean rates (±SE) of two spotted spider mites mortality, 24 hours after spraying. Treatments with different letters are significantly different (ANOVA, HSD Tukey-Kramer test, $\alpha=0.05$).

Results:

Treatments were significantly different 24 h after spraying (FIG. 6). The highest mortality rate was observed for composition 10.

Conclusions: The insecticidal and acaricidal effects of compositions of the present invention were very high especially for the eggs of the codling moth and the motile forms of the TSSM. An ovicidal effect of the compositions was observed. Since the eggs of the codling moth are exposed on apples or on apple leaves during oviposition in the orchards, these results suggest that no larvae would emerge from eggs and that no damage would be caused to apple by this pest. Moreover, the high toxicity of the compositions observed 24 hours after application on motile forms of TSSM is also an important criterion for controlling promptly this pest in the presence of high population density.

Example 10

Efficacy Against Major Pests: Bacteria

Fire blight, which causative agent is *Erwinia amylovora* is an important disease of apple, pear and some ornamental plants causing important economic losses for growers. Strategies for fire bight control include many integrated pest management practices including cultivar choice, infected parts removing, and copper sulfate or streptomycin applications. However, those treatments raise many concerns regarding toxicity (copper sulfate) and antimicrobial resistance development (streptomycin). An alternative treatment is needed and compositions of the present invention would be perfect candidates. The sensitivity of three strains of *Erwinia amylovora* to compositions of the present invention under laboratory conditions was determined and compared to the gold standard streptomycin, commonly used to control fire blight.

Composition

Composition 12 is prepared and is used to make the tested dilutions of 1, 2.5 and 5%.

TABLE 15

| | Composition tested | | | |
|---|---|---|---|---|
| Composition | 12 | 1% dilution | 2.5% dilution | 5% dilution |
| Thymol % | 23.00 | 0.23 | 0.58 | 1.15 |
| Surfactant % | 12.00 | 0.12 | 0.30 | 0.60 |
| Solvent % | 36.00 | 0.36 | 0.90 | 1.80 |
| Water % | Q.S. | Q.S. | Q.S. | Q.S. |

Two streptomycin-sensitive ($Sm^S$) strains of *E. amylovora* originated from Quebec, Canada (strains 433 and 435) and one streptomycin-resistant ($Sm^R$) strain originated from Oregon, USA (strain 153sm5). A streptomycin-sensitive *E. coli* strain, used as control, was obtained from ATCC® (ATCC 25922™). A sufficient quantity of composition 12 was dispensed into bottles containing King B agar medium, in order to obtain 1, 2.5 and 5% (v/v) solutions (corresponding to compositions containing thymol ranging from 0.23 to 1.15%). The 0% (v/v) concentration was obtained by adding 25 ml of ultra-pure sterile water to 475 ml of cooled medium. A volume of 20 ml of media was then distributed in 100×15 mm sterile Petri dishes. *E. amylovora* and *E. coli* strains were cultivated on King B agar medium for 72 h at 26° C. and on Trypticase Soy Agar medium overnight at 37° C., respectively. Individual colonies from plates were suspended in 5 ml of sterile saline solution (0.85% w/v) and adjusted to a cell density of approximately $15 \times 10^8$ colony-forming units (cfu) per milliliter. Aliquots (100 µl) of a dilution series of each bacterial suspension were spread on surfaces of King B agar medium and incubated for 72 h at 26° C. Bacterial strains were tested for streptomycin sensitivity at the following concentrations: 0, 100, 250 and 500 ppm. Bacterial strains were tested for composition 12 sensitivity at the following concentrations: 0%, 1%, 2.5%, and 5%. Briefly, the four strains by plate were tested for each concentration. An aliquot of 100 µl of each bacterial suspension was dropped on one of the four quadrants agar surface as follows: Q1) *E. amylovora* 433; Q2) *E. amylovora* 435; Q3) *E. amylovora* 153sm5; and Q4) *E. coli* ATCC 25922. Bacterial growth at the inoculation point was evaluated using a Quebec dark field colony counter after 24, 48 and 72 hours of incubation at 26° C. Sensitivity was determined from triplicate plates for each concentration.

Figure 7:
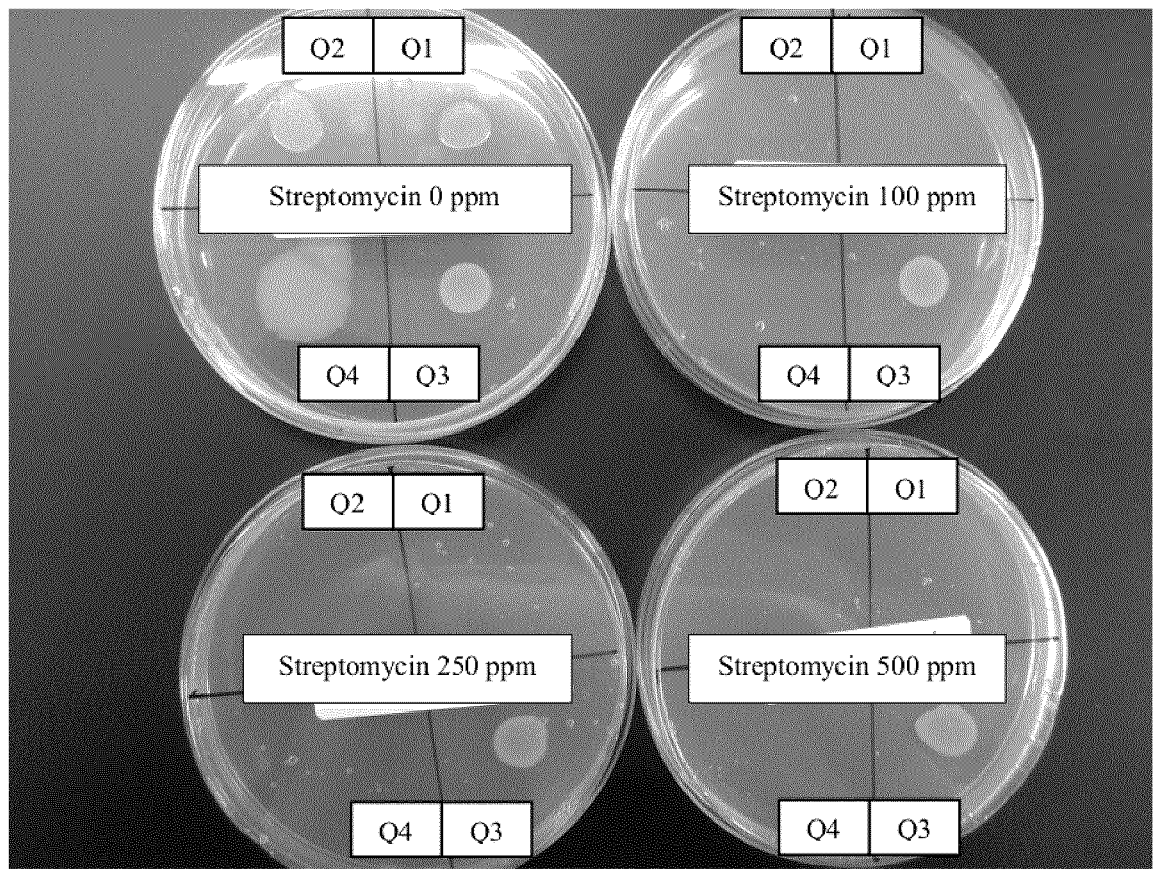
FIG. 7 illustrates the King B agar media containing streptomycin inoculated with bacterial suspensions for sensitivity test. Quadrant 1 (Q1), *E. amylovora* 433; Quadrant 2 (Q2), *E. amylovora* 435; Quadrant 3 (Q3), *E. amylovora* 153sm5; and Quadrant 4 (Q4), *E. coli* ATCC25922.

Results:

The two $Sm^S$ strains of *E. amylovora* and the *E. coli* strain were sensitive to streptomycin and did not grow on King B agar media containing streptomycin concentrations of 100, 250 and 500 ppm. In contrast, the $Sm^R$ strain of *E. amylovora* was not inhibited by streptomycin at any concentration tested (FIG. 7). All strains of *E. amylovora* and *E. coli* strain showed growth on King B agar media with no streptomycin.

Figure 8:
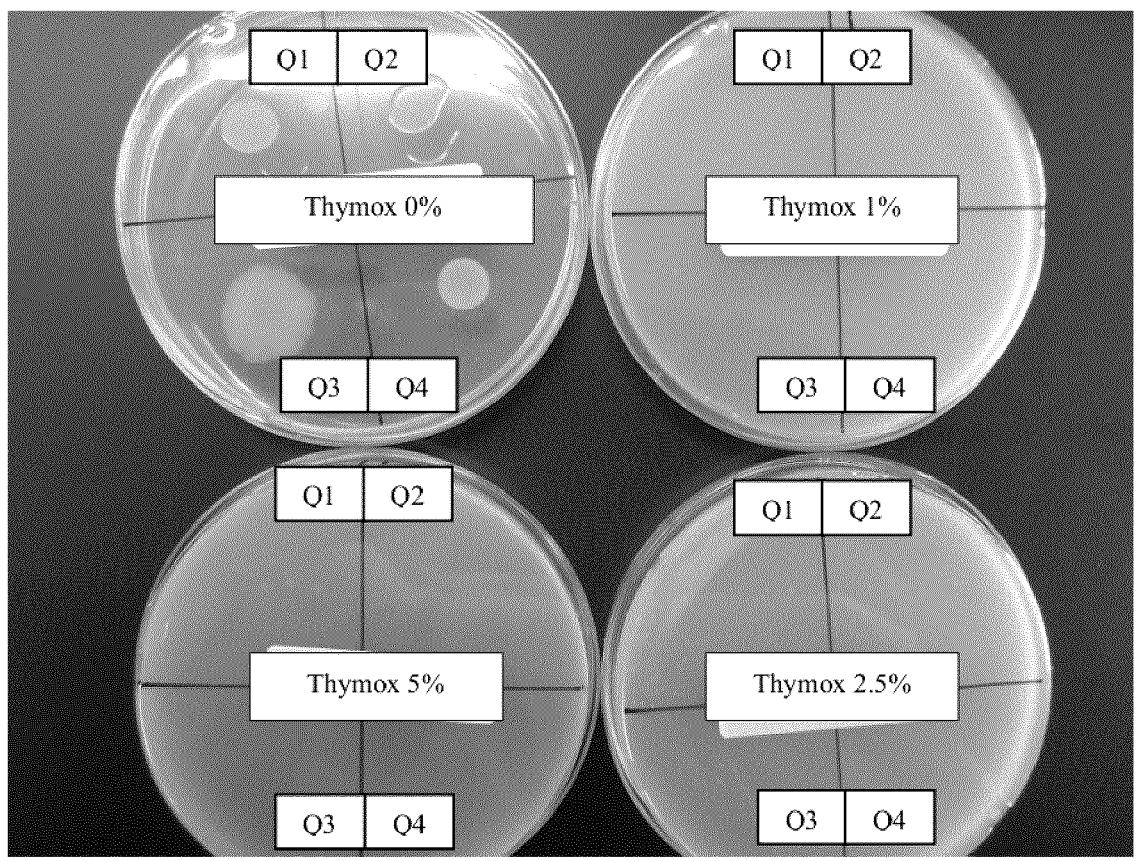
FIG. 8 illustrates the King B agar media containing Composition 12 at different dilutions inoculated with bacterial suspensions for sensitivity test. Quadrant 1 (Q1), *E. amylovora* 433; Quadrant 2 (Q2), *E. amylovora* 435; Quadrant 3 (Q3), *E. amylovora* 153sm5; and Quadrant 4 (Q4), *E. coli* ATCC25922.

The two $Sm^S$ strains of *E. amylovora*, the $Sm^R$ strain of *E. amylovora* and the *E. coli* strain were sensitive to compositions of the present invention and did not grow on King B agar media containing composition 12 at concentrations of 1, 2.5 and 5% (FIG. 8). All strains of *E. amylovora* and *E. coli* strain showed growth on King B agar media with no composition 12.

Conclusions: Results showed the bactericidal effect of compositions of the present invention on *Erwinia amylovora*, a major bacterial pest in orchards. Moreover, compositions of the present invention had an efficacy against an antibiotic resistant strain. Antibiotic (streptomycin) is currently the most widely used substance to fight fire blight in orchards and antibiotic resistance is rising. Compositions of the present invention are not only effective against this plant disease but also present an alternative treatment.

Example 11

Agronomic Impact on Potato Culture

Seed potato growers commonly use mineral oil-fungicide mix in their crop management practices to fight fungal diseases and against propagation of many viruses transmitted by aphids. Growers must combine or alternate the active molecules of the fungicides to reduce the risk that pathogenic fungi develop fungicide resistance. An effective fungicide treatment must have no impact, or positive impact on agronomic variables, in other words the fungicide dosage should allow mimimal phytotoxic effect for maximum phytoprotection and productivity. In this example, impact on productivity (agronomic impact) was evaluated.

Compositions of the present invention were evaluated for different agronomic variables, on potato plants. The potato cultivars Dark Red Chieftain (mid-season, round, red), Superior (mid-season, round, white) and Russet Burbank (late season, long, white) have been used in the trials. These varieties are representatives of the major markets of ware, peeled or seed potatoes. The following agronomic variables were studied: 1) phytotoxicity; 2) number and weight of tubers; 3) green plant percentage; 4) percentage of plants bearing dry leaflets; 5) percentage of plants with potato early blight.

Compositions of the present invention were applied A) alone, or B) in combination with a mix of mineral oil Superior 70 (10 L/ha) and one of the following fungicides: Ridomil (208 mL/ha, comprising MEFENOXAM™ (Metalaxl-M) as active ingredient), Bravo 500 (2.4 L/ha, containing chlorothalonil as active ingredient) or Manzate-Pro (2.24 Kg/ha, a coordination product of zinc ion and manganese ethylenebisdithiocarbamate, as an activeingredient), used in alternance. The compositions were applied five times on potato plants with seven to ten days intervals. The study has been realized in a potato field in Quebec, Canada. The experimental design comprised a group of 4 blocks of 5 plots for A) and 4 blocks of 4 plots for B). These trials have been realized from July to October. The first application was done 40 days after the plantation. Tubers were harvested after 80 days of growth. The control treatment was for A) water, and for B) water, and a mix of oil and fungicide.

TABLE 16

Composition tested

| Composition | A: composition tested alone Control: water | | | | B: Composition tested in combination with a mineral oil-fungicide mix (Ridomil, Bravo or Manzate-Pro, in alternance) Controls: water and mineral oil-fungicide | |
|---|---|---|---|---|---|---|
| | 9 | 8 | 13 | 14 | 15 | 16 |
| Thymol % | 0.46 | 0.23 | 0.12 | 0.02 | 0.46 | 0.12 |
| Surfactant % | 0.24 | 0.12 | 0.06 | 0.01 | 0.24 | 0.06 |
| Solvent % | 0.72 | 0.36 | 0.18 | 0.04 | 0.72 | 0.18 |
| Applied in field with oil and fungicide | no | no | no | no | yes | yes |
| Water % | Q.S. | Q.S. | Q.S. | Q.S. | Q.S. | Q.S. |

1) Phytotoxic Effect of Composition of the Present Invention:

Phytotoxicity symptoms have been assessed after the spray applications of the compositions alone or combined with mineral oil and a fungicide. The results obtained after all 5 spray applications are summarized in Table 17.

In summary, It was demonstrated that compositions of the present invention can be applied with no or low phytotoxic effects on potato plants. Phytotoxic effects are generally observed when the compositions of the present invention have higher concentrations of thymol (>0.23% thymol), surfactant and solvent. The phytotoxicity is thus dose-dependent. Higher dosage of thymol, surfactant and solvent can be tolerated by other plant species.

TABLE 17

Evaluation of the phytotoxicity of the spray application of compositions of the present invention on potato plants

| Composition applied | | Observations of the sprayed leaves and plants, after 5 sprayed applications with seven to ten days intervals |
|---|---|---|
| A | Water | Good turgescence, green midrib and foliage, leaves without spots and chlorosis |
| | 9 | Embossment, dark green midrib and foliage, many necrotic spots localized at the puddles |
| | 8 | Light wilting, dark green midrib and foliage, few necrotic spots localized at the puddles |
| | 13 | Good turgescence, green midrib and foliage, few necrotic spots localized at the puddles |
| | 14 | Good turgescence, green midrib and foliage, leaves without spots and chlorosis |
| B | Water | Good turgescence, green midrib and foliage, leaves without spots and chlorosis |
| | Oil + Fungicide | Good turgescence, green midrib and foliage, several leaves with spots and chlorosis |
| | 15 | Dark green midrib and foliage, many leaves embossments and necrotic spots localized at the puddles, several dry stems or leaves |
| | 16 | Light embossment, dark green midrib and foliage, few necrotic spots localized at the puddles |

Figure 9:
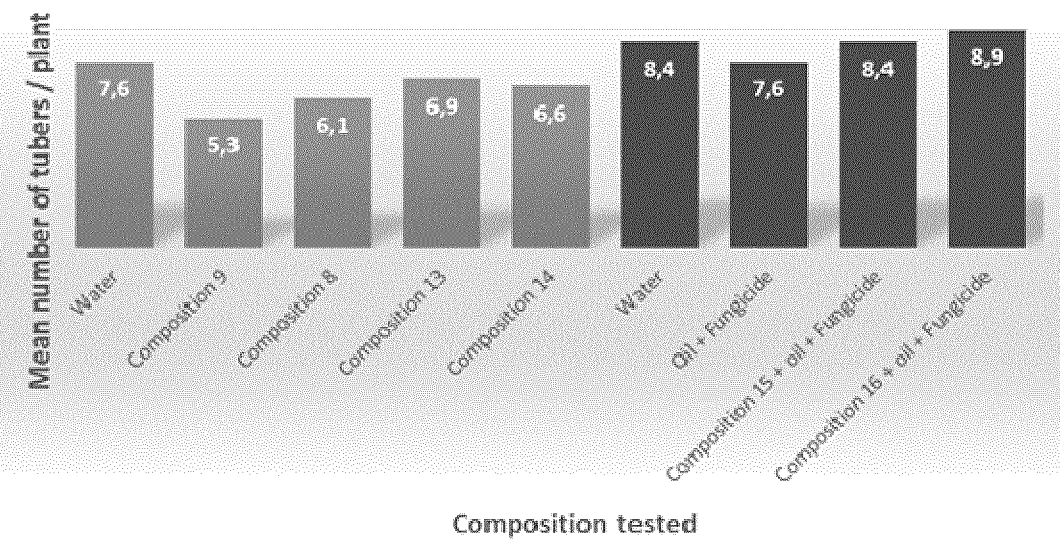
FIG. 9 illustrates the effect of compositions of the present invention on yield of harvested potato tubers at the end of the trial. This effect is measured as the mean of total tubers/plants (A) and mean weight of tubers and/plant (B). Light bars represent assay A where compositions of the present invention are applied alone, and dark bars represent assay B where compositions of the present invention are applied in combination with oil and fungicide.
Figure 9:
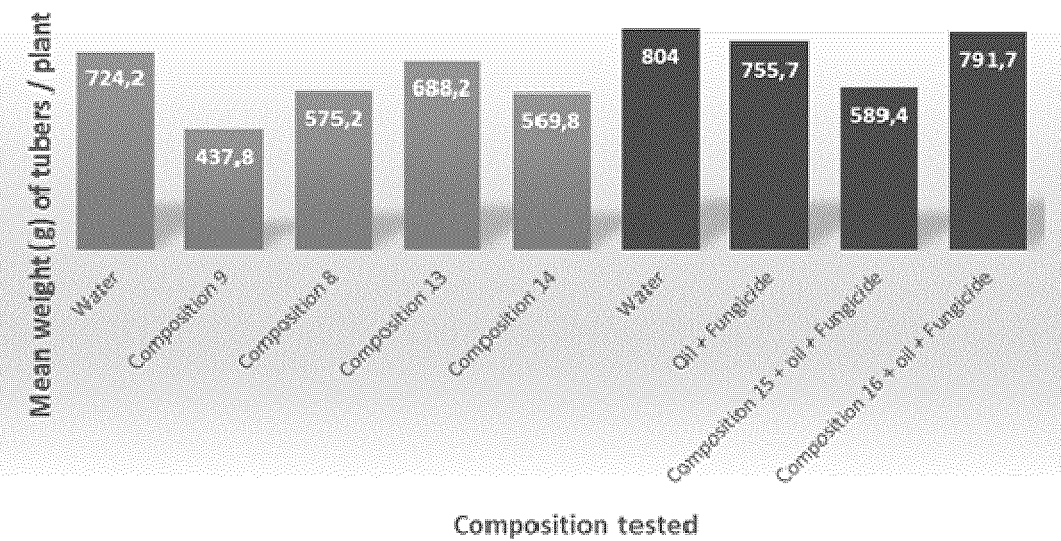

2) Potato Yield (Number and Weight):

FIGS. 9A and B present the average number (A) and weight (B) of tubers harvested at the end of the trial. It has been calculated for the total number of tubers harvested by plant, by plot and by treatment. The average number and weight of tubers per plant was determined in order to evaluate the impact of compositions of the present invention, alone or in a mineral oil-fungicide mix, on the plant physiology and the plant capacity to grow tubers initiated after the flowering period.

In summary, and in concordance with phytotoxicity evaluation, there is a tendency for the average number and weight of tubers per plant to decrease progressively as the concentration in thymol, surfactant and solvent increases in the compositions applied alone on the foliage of the potato plants. Composition 13 was determined as having the best impact on potato yield, when compared to the water control. In the second part of the assay, the compositions were applied in combination with mineral oil and a secondary fungicide. It was observed that for composition 16, embodiment of the present invention, the average weight of tubers was comparable to the controls, but that the number of tubers recovered/plants was unexpectedly greater than the controls. A synergistic effect between the composition of the present invention, oil and fungicide results in a positive impact on this agronomic variable.

3) Green Plants.

Figure 10:
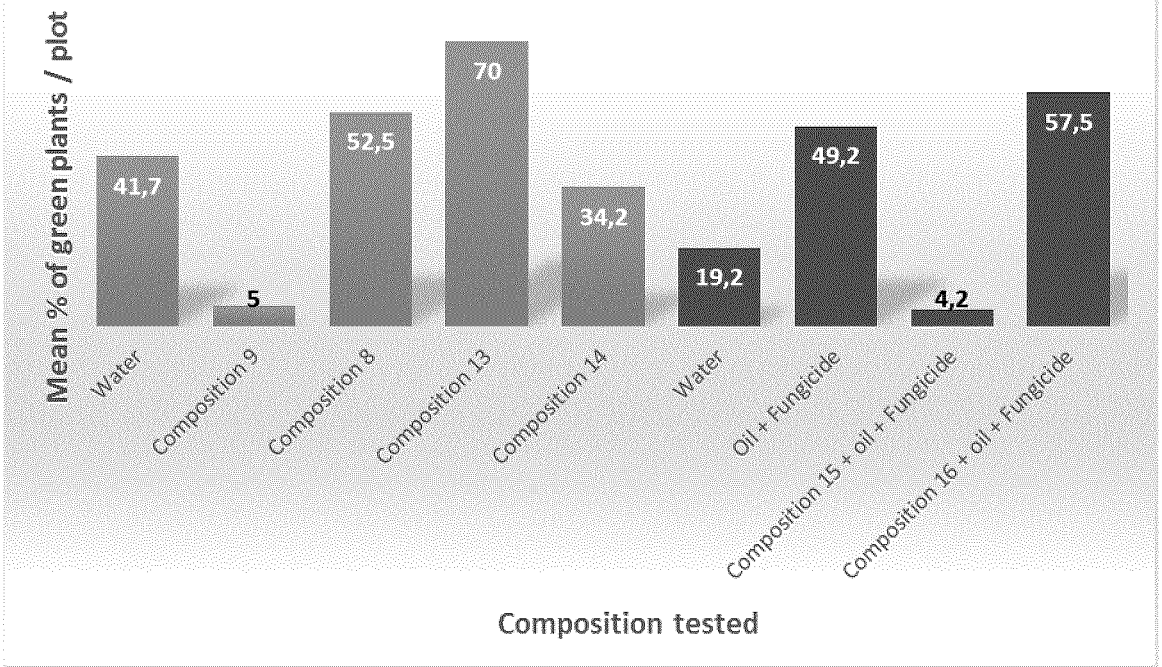
FIG. 10. illustrates the mean % of green plants after application of the compositions of the present invention. Light bars represent assay A where compositions of the present invention are applied alone, dark bars represent assay B where compositions of the present invention are applied in combination with oil and fungicide.

FIG. 10 shows the percentage of green plants in accordance with the applied compositions. A plot with a high percentage of green plants shows plants displaying a turgid green canopy with almost no spots or necrosis and the plants are occupying all the space on the row. A plot with plants displaying spotted or dry leafs and stems has an uneven canopy. These plots will have a smaller percentage of green plants.

In summary, for part A of the assay, the highest average percentage of green plants was found in the plots where composition 13 was applied alone, compared to the water treatment. For part B of the assay, more green plants resulted from the application of composition 16 in combination with oil and fungicide, compared to water or oil+fungicide alone. From these results, and with a composition containing specifically 0.12% of thymol, we unexpectedly observe that a) composition of the present invention has positive agronomic impact on the foliage of the potato plant and b) there is a synergistic effect between the composition, oil and another fungicide on this variable.

4) Plants with Dry Leaflets.

Figure 11:
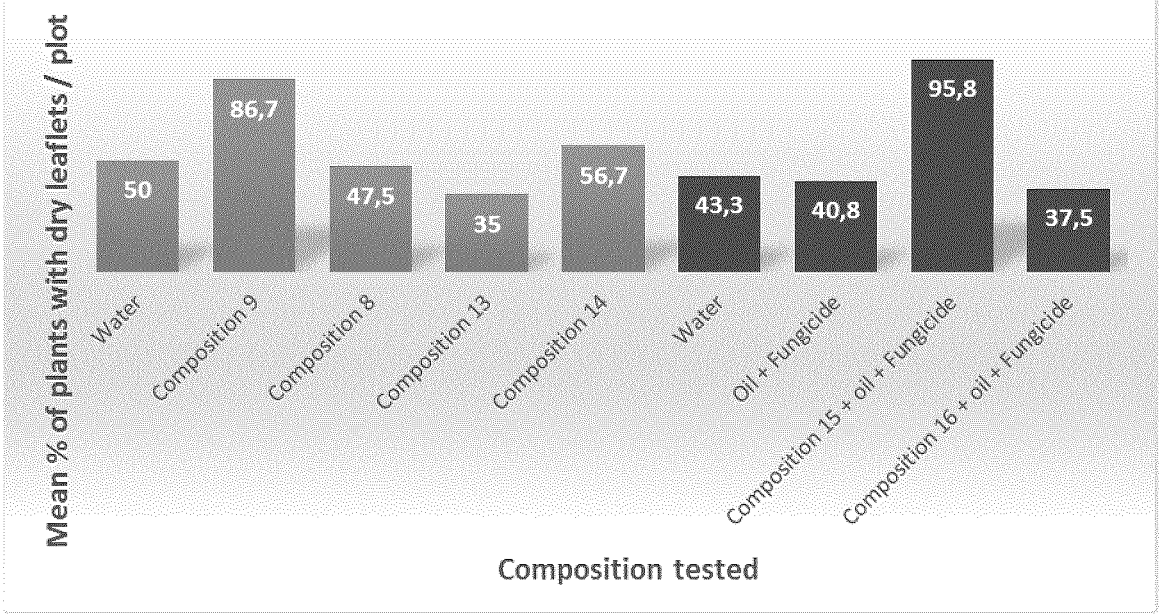
FIG. 11. illustrates the mean % of plants with dry leaflets after application of the compositions of the present invention. Light bars represent assay A where compositions of the present invention are applied alone, dark bars represent assay B where compositions of the present invention are applied in combination with oil and fungicide.

FIG. 11 shows the percentage of plants with dry leaflets. In summary, results are in accordance with the percentage of green plants. For part A of the assay, the smallest average percentage of plants displaying dry leaflets was found in the plots where composition 13 was applied alone, compared to the water treatment. For part B of the assay, less dry leaflets resulted from the application of composition 16 in combination with oil and fungicide, compared to water or oil+fungicide alone. From these results, and with a composition containing specifically 0.12% of thymol, we observe that a) composition of the present invention has positive agronomic impact on the foliage of the potato plant and b) there is a synergistic effect between the composition, oil and another fungicide on this variable.

5) Plants with Potato Early Blight.

Figure 12:
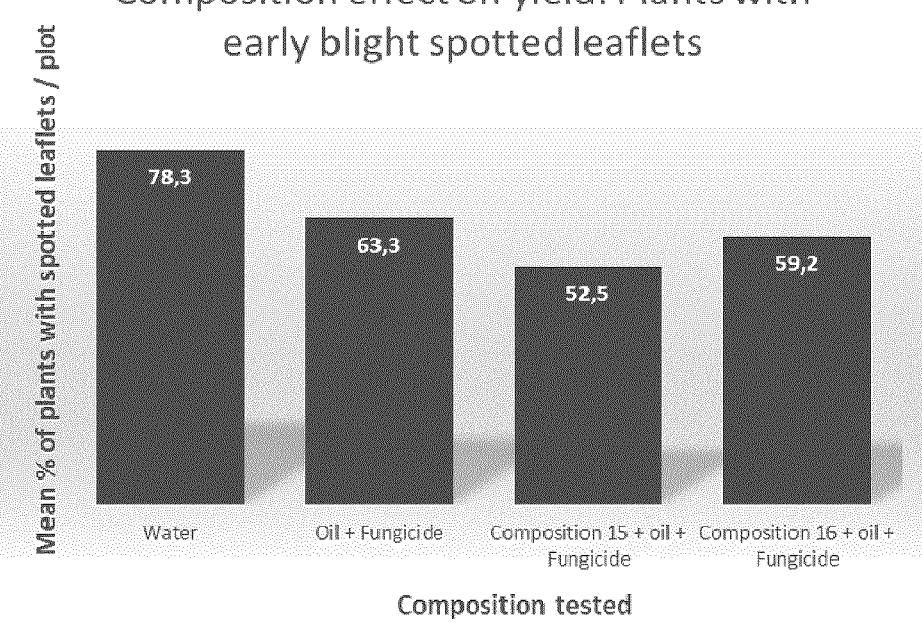
FIG. 12. illustrates the mean % of plants with early blight symptoms (spotted leaflets, panel A) and magnitude of symptoms (number of spots/leaflets, panel B) following the application of compositions of the present invention, in combination with oil and fungicide.
Figure 12:
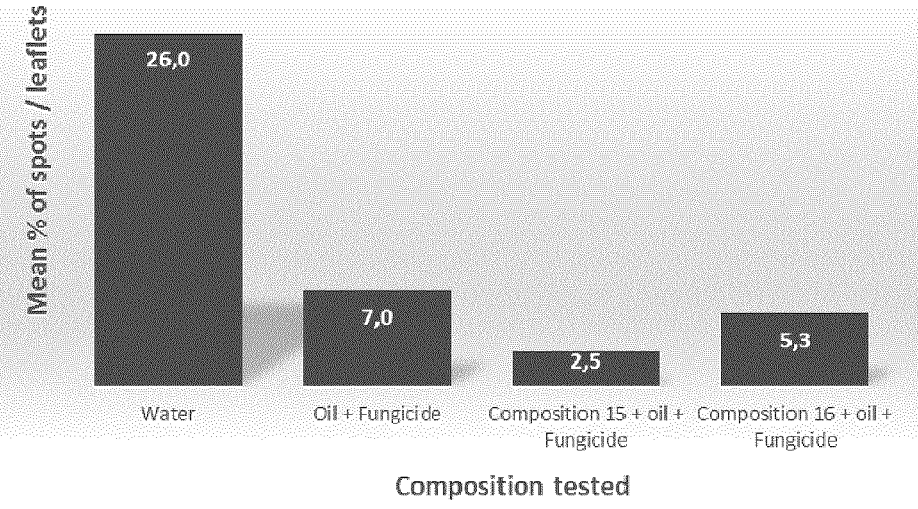

Plants affected by the early blight caused by the fungi *Alternaria alternata* (Fr:Fr) Keissl have leaves displaying well defined concentric brown spots. Spots from the early blight dry up progressively and when there are too many, the foliage dries up completely. FIGS. 12A and B shows the average percentage of plants displaying spotted leaflets per plot (A), and the average number of spot per leaflets (B), for the compositions applied in combination with oil and fungicide, compared to the controls water, and oil+fungicide.

In summary, the percentage of plants presenting symptoms of the fungal infection early blight was lower in plots treated with oil+fungicide, compared to water. When compositions of the present invention were applied with oil and fungicide, there was a greater decrease in symptoms, suggesting a synergistic phytoprotective effect between compositions of the present invention and oil+fungicide.

In conclusion, some compositions of the present invention can present phytotoxic effect on potato plants, but these effects may not be observed on other plants/crops. For this reason, the compositions should not be limited to the ones presenting no phytotoxic effect in this trial. It was also found that compositions of this invention presenting low phytotoxicity on potato plants were having a positive impact on different agronomic variables, particularly when the compositions were applied in combination with mineral oil and another fungicide. The synergistic effect between these components was observed on potato yield (quantity and weight of potatoes harvested, appearance of foliage) suggesting composition of the present invention can act as plant growth regulators, an unexpected result. This observation may be of particular importance to plants whose foliage of particular interest, such as lettuce or other varieties of plants whose leaves are edible. The synergistic effect was also observed on phytoprotection (protection against early blight), so the compositions of the present invention also have a fungicidal effect.

Example 12

Usage for Potato Seed Growing

Potato seed growers use pesticides to disinfect warehouses, tubers storage bins and machinery in order to produce pathogen-free tubers for the industry. *Clavibacter michiganensis* is a pathogen that causes the bacterial ring rot of potato, and causes major concerns for the seed potato industry all around the world. In this trial, it was examined if compositions of the present invention have a bactericidal effect on the pathogen on 1) agar plates and 2) wooden surface while 3) the phytotoxic effect of the compositions was evaluated on potato tubers with sprouts.

1) Bactericidal Effect on Agar Plates

The bacterial strain used for this test was *Clavibacter michiganensis* subsp. *Sepedonicus* (Cms, Potato bacterial ring rot). Fresh suspension of $10^9$ cells/mL was prepared in sterile NaCl 0.85% using loops of an actively growing purified culture of Cms kept on Tryptic Soy Agar (TSA). An aliquot of 100 µL of a fresh suspension was evenly spread on a TSA plate and four replicates per pathogens assay were prepared. The plates were left to dry for 2 hours in a biological hood. Then four sterile Whatmann no1 filter disks of 1.2 cm diameter were placed at squared angles from each other to form a cross onto the surface of the inoculated TSA plate.

A volume of 50 µL of water or one of the tested composition (Table 18) was deposited on a sterile filter disk. The four plates per Cms assay were incubated at 22° C. for four days. After each 24 hours of a three day period, a volume of 50 µL of each composition was applied on the corresponding filter disk. The radial zone of bacterial growth inhibition was evaluated for each filter disk after the $3^{rd}$ and the $4^{th}$ day of incubation. Results are presented in Table 19.

In summary, Compositions 8 and 13 showed bactericidal effect on Cms. The cumulative effects of three applications of these compositions have increased, over a 24 hours period, the radial zone of Cms growth inhibition from each filter disk.

TABLE 18

| Composition tested | | | |
|---|---|---|---|
| Composition | 8 | 13 | 14 |
| Thymol % | 0.23 | 0.12 | 0.02 |
| Surfactant % | 0.12 | 0.06 | 0.01 |
| Solvent % | 0.36 | 0.18 | 0.04 |
| Water % | Q.S. | Q.S. | Q.S. |

TABLE 19

Bactericidal effect of three applications of compositions 8, 13 and 14 on *Clavibacter michiganensis* subsp. *sepedonicus* (Cms)

| Composition | 3 days mean (mm) | 4 days mean (mm) |
|---|---|---|
| Water | 0.0 ± 0.0 | 0.0 ± 0.0 |
| 8 | 2.8 ± 0.5 | 9.0 ± 2.4 |
| 13 | 2.0 ± 0.0 | 4.1 ± 1.2 |
| 14 | 0.0 ± 0.0 | 0.0 ± 0.0 |

2) Bactericidal Effect on Wood

In order to mimic warehouse conditions, composition 8 of the present invention was tested on bacterial contamination of wood surface. A fresh suspension of $10^9$ cells/mL (1.0 OD 600 nm) was prepared in sterile NaCl 0.85% using loops of an actively growing purified culture of Cms kept on Tryptic Soy Agar (TSA). An aliquot of 100 µL of a fresh suspension was evenly spread on a 3 $cm^2$ surface of a wood stick and twelve replicates per pathogens assay were prepared. The sticks were left to dry for 2 hours in a biological hood. A volume of 4 mL of Composition 8 or 4 mL of sterile NaCl 0.85% was deposited in a tube to cover a little more than the surface of a wood stick. Four replicates of each solution were prepared. The eight wood sticks per Cms assay were incubated at 22° C. for 10 min. Then, each wood stick was left to dry for at least 20 min on a sterile filter paper in a biological hood. Then each wood stick was immersed in sterile NaCl 0.85% for 5 min under constant agitation to wash out the bacterial cells from the wood surface. As a control, four contaminated wood surface that were not immersed in Composition 8 or NaCl 0.85% were also washed in NaCl 0.85% for 5 min under constant agitation. For each resuspension, a volume of 100 μL was spread evenly on a TSA plate. Also, a volume of 100 μL of a 100 fold dilution was spread evenly on a TSA plate. For each Cms assay, the 24 inoculated TSA plates were incubated at 22° C. for 4 days. The total number of bacterial colonies was determined on each TSA to assess the bactericidal effect of Composition 8 when applied to disinfect a highly contaminated wood surface.

Between $3.4 \times 10^7$ cells and $5.7 \times 10^7$ cells of Cms cells were washed out from wood surfaces that were not treated or treated with the negative control solution NaCl 0.85%. No viable bacterial cells of Cms were washed out from the wood sticks that were treated with Composition 8. The wood surfaces contaminated with Cms cells were efficiently disinfected with Composition 8.

3) Phytotoxic Effect on Potato Tubers with Sprouts.

The phytotoxic effect of Compositions 8, 13 and 14 on potato tubers and sprouts was evaluated using Dark Red Chieftain tubers. The storage temperature was gradually increased from 8° C. to 18° C. to break their dormancy. The sprout length was monitored to confirm that 50 tubers showed sprout length varying between 0.5 cm and 1.5 cm (Group A), while 50 tubers showed sprout length varying between 2.0 cm and 4.5 cm (Group B). The length of each sprout of each tuber was recorded.

Compositions 8, 13 and 14 were prepared, along with the water control. Ten tubers of each group (A, B) were put in a meshed basket to be immersed 5 seconds into one of the 4 solutions. The tubers were left to dry before being put in a potting mix used to grow potato plants. 4 containers suitable to sustain the growth of 20 tubers (10 tubers per group) were used, one for each of the 4 treatments. All the tubers were covered with no more than 2 cm of potting mix. The containers were kept in a growth chamber under a 16 hours photoperiod at 22° C. (day) and 18° C. (night). Water was added to each container just enough to keep the soil humid.

After 12 days, the tubers were carefully taken out of the potting media. For each tuber, the length of each sprout was determined. To evaluate the effect of each treatment, the increase in the total sprouts length per tuber was calculated for each tuber groups. The results are presented in Table 20.

In summary, when compositions 8 and 13 were applied, an increase in the average length of sprouts was observed, compared to the water treatment. This was not observed with composition 14 that had the lowest concentration of each ingredient (thymol, surfactant and solvent). Also, very few phytotoxic effects were observed during the experiment, as only three tubers showed sprout necrosis in group A. Thus, it was herein shown that compositions of the present invention can unexpected stimulate the growth of sprouts on potato tubers. Not only some compositions of the present invention harbor low phytotoxicity on germinated potato tubers, but it is also a plant growth regulator with positive impact on the growth of sprouts of potato tubers.

TABLE 20

Impact of compositions 8, 13 and 14 on the average increase of sprouts length per tuber for two groups (A and B) of tubers treated.

| Group | Composition | Mean increase of sprouts length/tuber (mm) |
|---|---|---|
| A | Water | 9.1 ± 2.1 |
| A | 8 | 15.1 ± 6.4 |
| A | 13 | 11.2 ± 3.3 |
| A | 14 | 4.0 ± 0.7 |
| B | Water | 15.5 ± 2.9 |
| B | 8 | 27.6 ± 7.0 |
| B | 13 | 24.9 ± 6.2 |
| B | 14 | 10.4 ± 2.8 |

In conclusion, compositions of the present invention showed again their potential as a pesticide product for crop protection. Here, the compositions were effective in killing bacteria responsible for tubers infection in seed grower's installations, thus demonstrating its potential in preventing seed bacterial disease. Finally, specific compositions of the present invention presented very low phytotoxic effects on potato tubers, and they were at the same time stimulating the growth of sprouts on tubers, which is a desirable and unexpected effect for seed growers. The dual effect (bactericidal and growth stimulator) of compositions of the present invention was also unexpected.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A method for the control of pests of a seed or a plant, the method comprising contacting said seed or plant with a pesticidal amount of a pesticide composition consisting of:
   a) from about 0.1% to about 25% by weight of at least one antimicrobial compound comprising thymol;
   b) from about 0.1% to about 15% by weight of surfactant selected from the group consisting of sodium lauryl sulfate, sarkosyl, and cocamidopropyl betaine, to form a solution or dispersion of said at least one antimicrobial compound in water;
   c) from about 0.1% to about 40% by weight of propylene glycol methyl ether; and
   d) sufficient water to make 100 weight percent.

2. The method of claim 1, wherein said antimicrobial compound is of natural origin, of synthetic origin, or a combination thereof.

3. The method of claim 1, wherein said at least one antimicrobial compound is from about 0.1% to about 1.15% w/w of said composition.

4. The method of claim 1, wherein said at least one antimicrobial compound is from about 0.12% w/w, or about 0.23% w/w, or about 0.46% w/w, or about 1.15% w/w of said composition.

5. The method of claim 2, wherein said pest is chosen from an insect, a nematode, a fungus, a bacterium, a larva, a plant, an animal, a virus, a parasite, a gastropod, an arthropod, a snail, a slug, an alga, or combinations thereof.

6. The method of claim 1, wherein said plant is chosen from a banana plant, an apple tree, a pear tree, a potato plant, a rice plant, a coffee plant, a citrus tree, an onion, ginseng, soy, a weed or a tomato plant.

* * * * *